(12) United States Patent  
Yamazaki et al.

(10) Patent No.: US 9,042,016 B2  
(45) Date of Patent: May 26, 2015

(54) OPTICAL FILM, METHOD OF PRODUCING OPTICAL FILM, ANTIREFLECTIVE FILM, POLARIZING PLATE AND IMAGE DISPLAY DEVICE

(71) Applicants: Takayasu Yamazaki, Kanagawa (JP); Shuntaro Ibuki, Kanagawa (JP); Kazuo Kamohara, Kanagawa (JP)

(72) Inventors: Takayasu Yamazaki, Kanagawa (JP); Shuntaro Ibuki, Kanagawa (JP); Kazuo Kamohara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 271 days.

(21) Appl. No.: 13/649,619

(22) Filed: Oct. 11, 2012

(65) Prior Publication Data

US 2013/0094082 A1    Apr. 18, 2013

(30) Foreign Application Priority Data

Oct. 12, 2011  (JP) ................. 2011-225217

(51) Int. Cl.
| | |
|---|---|
| G02B 5/30 | (2006.01) |
| B32B 27/10 | (2006.01) |
| C09D 5/00 | (2006.01) |
| G02B 1/10 | (2006.01) |
| C08L 1/12 | (2006.01) |
| C09D 7/12 | (2006.01) |
| C08K 5/19 | (2006.01) |

(52) U.S. Cl.
CPC ............... C09D 5/006 (2013.01); G02B 1/105 (2013.01); G02B 5/3033 (2013.01); C08L 1/12 (2013.01); C09D 7/1233 (2013.01); C08K 5/19 (2013.01)

(58) Field of Classification Search
CPC ...... C09D 5/006; C09D 7/1233; G02B 1/105; G02B 5/3033; C08L 1/12; C08K 5/19
USPC ............................... 359/483.01, 601; 428/481
See application file for complete search history.

(56) References Cited

U.S. PATENT DOCUMENTS

| | | | | |
|---|---|---|---|---|
| 5,654,369 | A * | 8/1997 | Tsubaki et al. | 525/205 |
| 8,753,726 | B2 * | 6/2014 | Sera et al. | 428/1.3 |
| 2009/0068377 | A1 | 3/2009 | Kuki | |
| 2011/0141429 | A1 * | 6/2011 | Hisakado et al. | 349/158 |

FOREIGN PATENT DOCUMENTS

| | | |
|---|---|---|
| JP | 2001-247717 A | 9/2001 |
| JP | 2009-263567 A | 11/2009 |
| WO | 2009/031464 A1 | 3/2009 |

* cited by examiner

*Primary Examiner* — Frank Font  
(74) *Attorney, Agent, or Firm* — Jean C. Edwards, Esq.; Edwards Neils PLLC

(57) ABSTRACT

An optical film has a cellulose acylate film base material containing cellulose acylate and a plurality of sugar ester compounds having different ester substitution degrees in which an average ester substitution degree of the plurality of sugar ester compounds is from 60 to 94%, and an antistatic hardcoat layer formed from a coating composition containing at least an organic antistatic agent and a curable compound having a (meth)acryloyl group in a molecule of the curable compound.

10 Claims, 2 Drawing Sheets

Display Device

OPTICAL FILM, METHOD OF PRODUCING OPTICAL FILM, ANTIREFLECTIVE FILM, POLARIZING PLATE AND IMAGE DISPLAY DEVICE

CROSS-REFERENCE TO RELATED APPLICATIONS

This application claims priority from Japanese Patent Application No. 2011-225217, filed on Oct. 12, 2011, the contents of which are herein incorporated by reference in its entirety.

FIELD OF THE INVENTION

The present invention relates to an optical film, a method of producing an optical film, an antireflective film, a polarizing plate and an image display device. More particularly, it relates to an optical film which comprises an antistatic hardcoat layer on a cellulose acylate base material and is excellent in an antistatic property, hardness and an antistatic property after exposed to high temperature and high humidity environment, and an antireflective film, a polarizing plate and an image display device containing the optical film.

BACKGROUND OF THE INVENTION

In an image display device, for example, a cathode ray tube display device (CRT), a plasma display panel (PDP), an electroluminescence display (ELD), a vacuum fluorescent display (VFD), a field emission display (FED) or a liquid crystal display device, it is suitable to provide an optical film which is transparent and has an antistatic property and a hardcoat property in order to prevent breakage or scratch and to prevent reduction in visibility due to attachment of dust or the like on the display surface or destruction of the display device due to static electricity. In particular, in response to a resent trend, for example, upgrade in quality, increase in size, decrease in thinness or extension in lifespan to the image display device, it is requested for the optical film which is applied to the image display device to have good other performances in addition to the hardcoat property and antistatic property, and high durability.

Particularly, in a liquid crystal display device, it is suitable to use an optical film having a good balance between the hardcoat property and the antistatic property as a protective film for polarizing plate, and in order to maintain a good adhesion property to a polarizer in the form of polarizing plate, a cellulose acylate film is ordinarily used as a base material of optical film.

From the standpoint described above, the cellulose acylate film needs to have high transparency (low haze), good moisture permeability and good optical performances and it is adjusted heretofore to fulfill the performances by adding a specific plasticizer. However, a phosphate ester, for example, triphenyl phosphate (TPP), which is a typical plasticizer, sublimates in a drying step during the production of cellulose acylate film and thus, the contamination attached to the production line falls down onto the film to cause a problem of surface state failure or the like. In addition to the problem above, from the standpoint of providing a protective film for polarizing plate which is environmentally friendly and a method of producing thereof, it is required that the phosphate ester is not used as the plasticizer for cellulose acylate film.

It is known that a sugar or a derivative thereof is suitable in the use of plasticizer used in a cellulose film for optical film, and of the sugar and derivatives thereof, an example using a sugar ester compound is known (JP-A-2001-247717 (the term "JP-A" as used herein means an "unexamined published Japanese patent application") and WO 2009/031464).

Also, in order to obtain an optical film having both the antistatic property and the hardcoat property, it is known to form an antistatic hardcoat layer using a composition containing an ion conducting polymer, for example, a quaternary ammonium salt group-containing polymer as an antistatic agent and a polyfunctional monomer to form a binder (for example, JP-A-2009-263567).

SUMMARY OF THE INVENTION

Under these circumstances the inventors have investigated physical properties of a film obtained by using the sugar ester compounds described in JP-A-2001-247717 and WO 2009/031464 in combination with a cellulose acylate film from the standpoint of replacing or improving a plasticizer which has been heretofore used, for example, triphenyl phosphate (TPP). However, it has been found that when the sugar ester compound having a high substitution degree described in JP-A-2001-247717 and WO 2009/031464 is used, high hardness, good antistatic property and antistatic property after exposed to high temperature and high humidity environment can not be simultaneously fulfilled and that a further improvement is requested.

An object of the present invention is to provide an optical film which is excellent in transparency, a hardcoat property and an antistatic property and has good antistatic property under high temperature and high humidity conditions. Another object of the invention is to provide an antireflective film of good performances using the optical film, a polarizing plate of good performances using the optical film, and an image display device using the optical film, the antireflective film or the polarizing plate.

As a result of the intensive investigations for the purpose of solving the problems described above, the inventors have found that an optical film which is excellent in transparency, a hardcoat property and an antistatic property and in which an antistatic property after exposed to high temperature and high humidity environment is improved can be obtained by using a composition containing an organic antistatic agent as an antistatic agent and a multifunctional monomer to form a binder in combination with a cellulose acylate film base material containing a sugar ester compound having a specific ester substitution degree as a plasticizer.

Specifically, the problems described above are solved by the present invention having the constituents shown below.

(1) An optical film comprising a cellulose acylate film base material containing a plurality of sugar ester compounds having different ester substitution degrees in which an average ester substitution degree of the plurality of sugar ester compounds is from 60 to 94% and cellulose acylate, and an antistatic hardcoat layer formed from a coating composition containing at least an organic antistatic agent and a curable compound having a (meth)acryloyl group in its molecule.

(2) The optical film as described in (1) above, wherein a content of a sugar ester compound having an ester substitution degree of 75% or more is 80% by mole or less based on the plurality of sugar ester compounds.

(3) The optical film as described in (1) or (2) above, wherein the antistatic hardcoat layer is formed from a coating composition containing at least an organic antistatic agent, a curable compound having three or more (meth)acryloyl groups in its molecule, an initiator and a solvent.

(4) The optical film as described in any one of (1) to (3) above, wherein the organic antistatic agent is an antistatic agent having a quaternary ammonium salt group.

(5) The optical film as described in (4) above, wherein a content of the antistatic agent having a quaternary ammonium salt group is from 1 to 12% by weight based on a weight of the curable compound having a (meth)acryloyl group in the coating composition for forming antistatic hardcoat layer.

(6) The optical film as described in any one of (1) to (5) above, wherein a total content of a curable compound having a (meth)acryloyl group and further having at least one group selected from a hydroxy group, a carboxy group and a urethane group is 40% by weight or less based on a total weight of the curable compound having a (meth)acryloyl group in the coating composition for forming antistatic hardcoat layer.

(7) A method of producing an optical film as described in any one of (1) to (6) above comprising applying the coating composition and curing the applied coating composition.

(8) An antireflective film comprising a low refractive index layer either directly or through other layer on the optical film as described in any one of (1) to (6) above.

(9) A polarizing plate comprising the optical film as described in any one of (1) to (6) above or the antireflective film as described in (8) above, as a protective film for the polarizing plate.

(10) An image display device comprising the optical film as described in any one of (1) to (6) above, the antireflective film as described in (8) above or the polarizing plate as described in (9) above.

According to the present invention, an optical film which is excellent in transparency, a hardcoat property and an antistatic property and has good antistatic property after exposed to high temperature and high humidity conditions can be provided. Also, by using the optical film according to the invention, an antireflective film which prevents the reduction in visibility due to attachment of dust or the like or the destruction of a display device due to static electricity and is excellent in the durability, a polarizing plate, and an image display device using the same can be provided.

DETAILED DESCRIPTION OF THE INVENTION

The invention will be described in detail below. The description of the constituent element below is made based on the typical embodiment of the invention in some cases, but the invention should not be construed as being limited thereto. In the specification, a numerical value range represented by using the term "to" means a range which includes the numerical values described before and after the term "to" as a lower limit and an upper limit, respectively.

Figure 1:
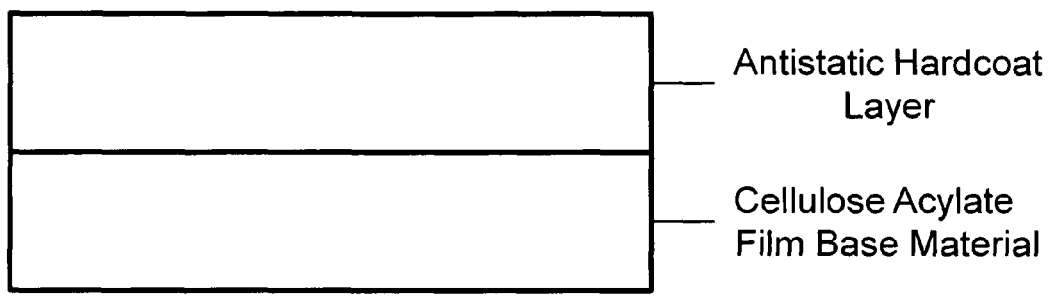
FIG. 1 is a sectional view of an optical film of the present invention.

The optical film according to the invention, as shown in FIG. 1, is an optical film comprising a cellulose acylate film base material containing a plurality of sugar ester compounds having different ester substitution degrees in which an average ester substitution degree of the plurality of sugar ester compounds is from 60 to 94% and cellulose acylate, and an antistatic hardcoat layer formed from a coating composition containing at least an organic antistatic agent and a curable compound having a (meth)acryloyl group in its molecule.

[Cellulose Acylate Film Base Material]

The cellulose acylate film base material in the optical film according to the invention contains a plurality of sugar ester compounds having different ester substitution degrees and cellulose acylate, wherein an average ester substitution degree of the plurality of sugar ester compounds is from 60 to 94%.

<Cellulose Acylate>

The cellulose acylate according to the invention is preferably that having an acetyl substitution degree from 2.70 to less than 2.95. When the acetyl substitution degree is 2.70 or more, the cellulose acylate has a good compatibility to the sugar ester compound (for example, sucrose benzoate having a specific substitution degree) satisfying the conditions described below and is preferred because transparency of the film becomes good. Further, in addition to the transparency, a moisture permeability and a water content become good. On the other hand, the substitution degree of less than 2.95 is preferred because the optical performances are not impaired.

The acetyl substitution degree of cellulose acylate is more preferably from 2.75 to 2.90, and particularly preferably from 2.82 to 2.87. A preferred range of a total acyl substitution degree is also same as the preferred range of the acetyl substitution degree described above.

The substitution degree of acyl group including an acetyl group can be determined according to the method defined in ASTM-D817-96. The portion which is not substituted with an acyl group is ordinarily present as a hydroxy group.

The fundamental principle of the synthesis method of cellulose acylate is described in Migita et al, *Mokuzai Kaeaku (Wood Chemistry)*, pp. 180 to 190, Kyoritsu Shuppan Co., Ltd. (1968). A typical synthesis method includes a liquid phase acetylation method with carboxylic acid anhydride-acetic acid-sulfuric acid catalyst.

In order to obtain the cellulose acylate, specifically, a cellulose raw material, for example, raw cotton or wood pulp is pretreated with an appropriate amount of acetic acid, and then put into a carboxylation mixed solution previously cooled to conduct esterification, thereby synthesizing a complete cellulose acylate (total of the acyl substitution degrees at 2-position, 3-position and 6-position is approximately 3.00). The carboxylation mixed solution ordinarily contains acetic acid as a solvent, a carboxylic acid anhydride as an esterifying agent, and sulfuric acid as a catalyst. The carboxylic acid anhydride is ordinarily used in an amount stoichiometrically in excess of the total of cellulose reacting with the carboxylic acid anhydride and moisture present in the system. After the completion of the esterification reaction, an aqueous solution containing a neutralizing agent (for example, a carbonate, acetate or oxide of calcium, magnesium, iron, aluminum or zinc) is added in order to hydrolyze the excess carboxylic acid anhydride remaining in the system and to neutralize a part of the esterification catalyst. Then, the obtained complete cellulose acylate is subjected to saponification ripening by maintaining from 50 to 90° C. in the presence of a small amount of the esterification reaction catalyst (ordinarily, the remaining sulfuric acid) to be changed to cellulose acylate having the desired acyl substitution degree and polymerization degree. At the point when the desired cellulose acylate is obtained, the catalyst remaining in the system is completely neutralized using the neutralizing agent as described above, or without neutralizing the catalyst, the cellulose acylate solution is put into water or dilute acetic acid (alternatively, water or dilute acetic acid is put into the cellulose acylate solution) to separate cellulose acylate, followed by conducting washing and stabilization treatment, whereby the specific cellulose acylate can be obtained.

A molecular weight of the cellulose acylate is preferably from 40,000 to 400,000, more preferably from 100,000 to 350,000, in terms of number average molecular weight (Mn). An Mw/Mn ratio of the cellulose acylate for use in the invention is preferably 4.0 or less, and more preferably from 1.4 to 2.3.

In the invention, the average molecular weight and molecular weight distribution of the cellulose acylate and the like are obtained by determining a number average molecular weight (Mn) and a weight average molecular weight (Mw) using gel permeation chromatography (GPC) and calculating according to a method described in WO 2008/126535.

<Sugar Ester Compound>

The cellulose acylate film base material according to the invention contains a plurality of sugar ester compounds having different ester substitution degrees in which an average ester substitution degree of the plurality of sugar ester compounds is from 60 to 94%.

The sugar ester compounds are added to cellulose acylate to produce a cellulose acylate film base material and an antistatic hardcoat layer described hereinafter is provided on the cellulose acylate film base material, whereby an optical film having the excellent hardness and antistatic property and being excellent in the antistatic property after exposed to high temperature and high humidity environment is produced. By using the optical film according to the invention in a liquid crystal display device, a front contract can be improved.

—Sugar Residue—

The sugar ester compound means a compound in which at least one group (for example, a hydroxy group or a carboxyl group) which can be substituted in a polysaccharide constituting the compound and at least one substituent are ester-bonded to each other. Specifically, the sugar ester compound as referred to herein also includes a sugar derivative in a broad sense of the term and includes a compound containing a sugar residue as a structure, for example, gluconic acid. Specifically, the sugar ester compound includes also an ester between glucose and a carboxylic acid and an ester between gluconic acid and an alcohol.

The group which can be substituted in a polysaccharide constituting the sugar ester compound is preferably a hydroxy group.

The sugar ester compound includes a structure derived from a polysaccharide (hereinafter also referred to as a "sugar residue") constituting the sugar ester compound. The structure of the sugar residue per monosaccharide is referred to as a structural unit of the sugar ester compound. It is preferred that the structural unit of the sugar ester compound contains a pyranose structure unit or a furanose structural unit, and it is more preferred that all of the sugar residues are a pyranose structural unit or a furanose structural unit. Also, in the case where the sugar ester compound is constituted from a polysaccharide, it is preferred to contain together a pyranose structural unit or a furanose structural unit.

The sugar residue of the sugar ester compound may be derived from a pentasaccharide or a hexasaccharide and is preferably derived from a hexasaccharide.

A number of structural units contained in the sugar ester compound is preferably from 2 to 4, more preferably from 2 to 3, and particularly preferably 2. Specifically, the sugar constituting the sugar ester compound is preferably a disaccharide, a trisaccharide or a tetrasaccharide, more preferably a disaccharide or a trisaccharide, and particularly preferably a disaccharide.

In the invention, the sugar ester compound is preferably a sugar ester compound containing from 2 to 4 pyranose structural units or furanose structural units in which at least one of hydroxy groups is esterified, and more preferably a sugar ester compound containing two pyranose structural units or furanose structural units in which at least one of hydroxy groups is esterified.

Examples of the monosaccharide or the sugar containing from 2 to 4 monosaccharide units include erythrose, threose, ribose, arabinose, xylose, lyxose, arose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, maltotriose, manninotriose, melezitose, panose, planteose, raffinose, solatriose, umbelliferose, lycotetraose, maltotetraose, stachyose, baltopentaose, belbalcose, maltohexaose, xylitol and sorbitol.

Among them, ribose, arabinose, xylose, lyxose, glucose, fructose, mannose, galactose, trehalose, maltose, cellobiose, lactose, sucrose, sucralose, xylitol and sorbitol are preferred, arabinose, xylose, glucose, fructose, mannose, galactose, maltose, cellobiose and sucrose are more preferred, and xylose, glucose, fructose, mannose, galactose, maltose, cellobiose, sucrose, xylitol and sorbitol are particularly preferred.

—Structure of Substituent—

The sugar ester compound including the substituent for use in the invention more preferably has a structure represented by formula (1) shown below.

$$(OH)_p\text{-}G\text{-}(L^1\text{-}R^{11})_q(O\text{—}R^{12})_r \qquad \text{Formula (1)}$$

In formula (1), G represents a sugar residue, $L^1$ represents any one of —O—, —CO— and —$NR^{13}$—, $R^{11}$ represents a hydrogen atom or a monovalent substituent, $R^{12}$ represents a monovalent substituent bonded with an ester bond. p, q and r each independently represents an integer of 0 or more and (p+q+r) is equal to a number of hydroxy groups in the case of supposing that G is an unsubstituted saccharide of a cyclic acetal structure. $R^{13}$ represents a hydrogen atom or a monovalent substituent (preferably an alkyl group).

A preferred range of G is same as the preferred range of the sugar residue described above.

$L^1$ is preferably —O— or —CO— and more preferably —O—. When $L^1$ is —O—, a connecting group derived from an ester bond or an ether bond is particularly preferred, and a connecting group derived from an ester bond is more particularly preferred.

When plural $L^1$ are present, they may be the same or different from each other.

At least one of $R^{11}$ and $R^{12}$ preferably has an aromatic ring.

In particular, when $L^1$ is —O— (that is, the hydroxy groups of the sugar ester compound are substituted with $R^{11}$ and $R^{12}$), $R^{11}$, $R^{12}$ and $R^{13}$ are preferably selected from a substituted or unsubstituted acyl group, a substituted or unsubstituted aryl group, a substituted or unsubstituted alkyl group and a substituted or unsubstituted amino group, more preferably selected from a substituted or unsubstituted acyl group, a substituted or unsubstituted alkyl group and a substituted or unsubstituted aryl group, and particularly preferably selected from an unsubstituted acyl group, a substituted or unsubstituted alkyl group and an unsubstituted aryl group.

When plural $R^{11}$, plural $R^{12}$ or plural $R^{13}$ are present, they may be the same or different from each other, respectively.

p represents an integer of 0 or more and a preferred range is same as a preferred range of a number of hydroxy groups per monosaccharide unit described hereinafter.

r is preferably a number larger than a number of a pyranose structural unit or a furanose structural unit included in G.

q is preferably 0.

Since (p+q+r) is equal to a number of hydroxy groups in the case of supposing that G is an unsubstituted saccharide of a cyclic acetal structure, the upper limits of p, q and r are defined univocally, respectively.

Preferred examples of the substituent of the sugar ester compound include an alkyl group (preferably an alkyl group having from 1 to 22 carbon atoms, more preferably an alkyl group having from 1 to 12 carbon atoms, and particularly preferably an alkyl group having from 1 to 8 carbon atoms, for example, a methyl group, an ethyl group, a propyl group, a hydroxyethyl group, a hydroxypropyl group, a 2-cyanoethyl group or a benzyl group), an aryl group (preferably an aryl group having from 6 to 24 carbon atoms, more preferably an aryl group having from 6 to 18 carbon atoms, and particularly preferably an aryl group having from 6 to 12 carbon atoms, for example, a phenyl group or a naphthyl group), an acyl group (preferably an acyl group having from 1 to 22 carbon atoms, more preferably an acyl group having from 2 to 12 carbon atoms, and particularly preferably an acyl group having from 2 to 8 carbon atoms, for example, an acetyl group, a propionyl group, a butyryl group, an isobutyryl group, a pentanoyl group, a hexanoyl group, an octanoyl group, a benzoyl group, a toluoyl group or a phthalyl group), an amido group (preferably an amido group having from 1 to 22 carbon atoms, more preferably an amido group having from 2 to 12 carbon atoms, and particularly preferably an amido group having from 2 to 8 carbon atoms, for example, a formamido group or an acetamido group), and an imido group (preferably an imido group having from 4 to 22 carbon atoms, more preferably an imido group having from 4 to 12 carbon atoms, and particularly preferably an imido group having from 4 to 8 carbon atoms, for example, a succinimido group or a phthalimido group). Among them, an alkyl group and an acyl group are more preferred, and a methyl group, an acetyl group, an isobutyryl group and a benzoyl group are more preferred. The substituent is particularly preferably at least one of a benzoyl group and an acetyl group, and a benzoyl group is more particularly preferred.

As to a method of obtaining the sugar ester compound, it is available as commercial products, for example, from Tokyo Chemical Industry Co., Ltd. or Sigma-Aldrich, or can be synthesized by applying a known ester derivative-forming method (for example, a method described in JP-A-8-245678) to a commercially available carbohydrate.

A number average molecular weight of the sugar ester compound is preferably in a range from 200 to 3,500, more preferably in a range from 200 to 3,000, and particularly preferably in a range from 250 to 2,000.

Specific examples of the sugar ester compound which can be used in the invention are set forth below, but the invention should not be construed as being limited thereto.

In the structural formulae shown below, R each independently represents an appropriate substituent and plural R may be the same or different from each other. The substitution degree described in Tables 1 to 4 shown below indicates the kind of substituent and the number of substituent in the substituents which can be ester-substituted in each structural formula. For example, as to Compound 112 shown below, it is indicated that 3 substituents of 8 substituents which can be substituted are ester-substituted with benzoyl groups, and as to Compound 117 shown below, it is indicated that 8 substituents which can be substituted are all ester-substituted with benzoyl groups. The ester substitution degrees of these compounds which are used in the examples described hereinafter are 37.5% and 100%, respectively. In the case where plural kinds of the compounds having different ester substitution degrees are used in combination, the sum of numerical values obtained by multiplying the ester substitution degree of each compound by its content molar ratio (mole fraction) is used as an average ester substitution degree.

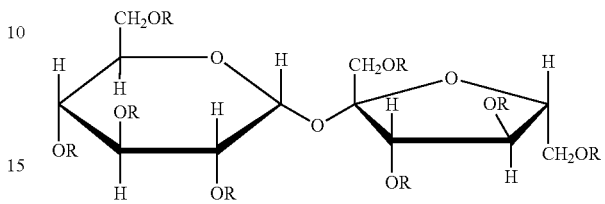

| Compound | Substituent 1 | | Substituent 2 | | Molecular Weight |
|---|---|---|---|---|---|
| | Kind | Substitution Degree | Kind | Substitution Degree | |
| 101 | Acetyl | 7 | Benzyl | 1 | 727 |
| 102 | Acetyl | 6 | Benzyl | 2 | 775 |
| 103 | Acetyl | 7 | Benzoyl | 1 | 741 |
| 104 | Acetyl | 6 | Benzoyl | 2 | 802 |
| 105 | Benzyl | 2 | None | 0 | 523 |
| 106 | Benzyl | 3 | None | 0 | 613 |
| 107 | Benzyl | 4 | None | 0 | 702 |
| 108 | Acetyl | 7 | Phenylacetyl | 1 | 771 |
| 109 | Acetyl | 6 | Phenylacetyl | 2 | 847 |
| 110 | Benzoyl | 1 | None | 0 | 446 |
| 111 | Benzoyl | 2 | None | 0 | 550 |
| 112 | Benzoyl | 3 | None | 0 | 654 |
| 113 | Benzoyl | 4 | None | 0 | 758 |
| 114 | Benzoyl | 5 | None | 0 | 862 |
| 115 | Benzoyl | 6 | None | 0 | 966 |
| 116 | Benzoyl | 7 | None | 0 | 1,070 |
| 117 | Benzoyl | 8 | None | 0 | 1,174 |

TABLE 2

| Compound | Substituent 1 | | Substituent 2 | | Molecular Weight |
|---|---|---|---|---|---|
| | Kind | Substitution Degree | Kind | Substitution Degree | |
| 118 | Isobutyryl | 8 | None | 0 | 887 |
| 119 | Isobutyryl | 7 | Acetyl | 1 | 860 |
| 120 | Isobutyryl | 6 | Acetyl | 2 | 833 |
| 121 | Isobutyryl | 5 | Acetyl | 3 | 806 |
| 122 | Isobutyryl | 4 | Acetyl | 4 | 779 |

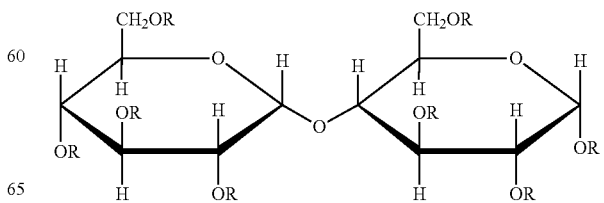

TABLE 3

| Compound | Substituent 1 | | Substituent 2 | | Molecular Weight |
|---|---|---|---|---|---|
| | Kind | Substitution Degree | Kind | Substitution Degree | |
| 301 | Acetyl | 6 | Benzoyl | 2 | 803 |
| 302 | Acetyl | 6 | Benzyl | 2 | 775 |
| 303 | Acetyl | 6 | Phenylacetyl | 2 | 831 |
| 304 | Benzoyl | 2 | None | 0 | 551 |
| 305 | Benzyl | 2 | None | 0 | 552 |
| 306 | Phenylacetyl | 2 | None | 0 | 579 |

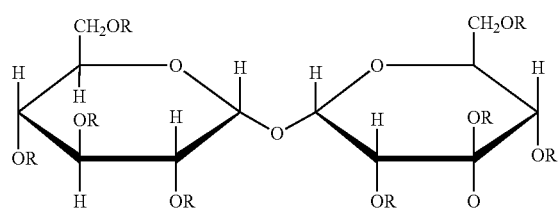

TABLE 4

| Compound | Substituent 1 | | Substituent 2 | | Molecular Weight |
|---|---|---|---|---|---|
| | Kind | Substitution Degree | Kind | Substitution Degree | |
| 401 | Acetyl | 6 | Benzoyl | 2 | 803 |
| 402 | Acetyl | 6 | Benzyl | 2 | 775 |
| 403 | Acetyl | 6 | Phenylacetyl | 2 | 831 |
| 404 | Benzoyl | 2 | None | 0 | 551 |
| 405 | Benzyl | 2 | None | 0 | 552 |
| 406 | Phenylacetyl | 2 | None | 0 | 579 |

The sugar ester compound is preferably contained from 2 to 30% by weight, more preferably from 5 to 20% by weight, particularly preferably from 5 to 15% by weight, relative to the cellulose acylate.

(Content Rate of Sugar Ester Compound Having Different Ester Substitution Degrees)

The cellulose acylate film base material according to the invention contains a plurality of sugar ester compounds having different ester substitution degrees and in which an average ester substitution degree of the plurality of sugar ester compounds is from 60 to 94%. The average ester substitution degree of the sugar ester compounds is preferably from 60 to 85%, and more preferably from 65 to 80%. By regulating the average ester substitution degree of the sugar ester compounds in the range described above, when an antistatic hardcoat layer described hereinafter is provided on the cellulose acylate film base material, an optical film excellent in the transparency, hardcoat property and antistatic property and excellent in the antistatic property after exposed to high temperature and high humidity conditions is obtained.

According to the invention, it is preferred that the content of the sugar ester compound having an ester substitution degree of 75% or more is 80% by mole or less based on the plurality of sugar ester compounds from the standpoint of the transparency of the cellulose acylate. The content of the sugar ester compound having an ester substitution degree of 75% or more is more preferably from 30 to 75% by mole, and still more preferably from 45 to 75% by mole.

The average ester substitution degree of plural sugar ester compounds having different ester substitution degrees is from 60 to 94%, preferably from 60 to 85%, and more preferably from 65 to 80%. To regulate the average ester substitution degree of plural sugar ester compounds having different ester substitution degrees to the range described above means to regulate an average number of hydroxy groups per a structural unit in the plural sugar ester compounds having different ester substitution degrees. It is believed that by regulating the number of hydroxy groups per a structural unit in the sugar ester compounds having different ester substitution degrees, when exposed to high temperature and high humidity conditions, migration of the sugar ester compound to the antistatic hardcoat layer is prevented and the interaction thereof with the organic antistatic agent in the antistatic hardcoat layer is restrained to improve durability of the antistatic performance. Further, by regulating the average ester substitution degree in the range according to the invention, it is possible to obtain a cellulose acylate base material film having a high elastic modulus and thus, the optical film according to the invention enables to achieve a good balance between the high hardness and the durability.

(Method of Preparing Plural Sugar Ester Compounds Having Different Ester Substitution Degrees)

As to a method of mixing a plurality of the sugar ester compounds having different ester substitution degrees, there is no particular restriction and a known method may be used. As to timing of the mixing a plurality of the sugar ester compounds having different ester substitution degrees, for example, when a solution film-forming method is adopted, the mixing of a plurality of the sugar ester compounds may be conducted before addition to a cellulose acylate dope or a plurality of the sugar ester compounds may be added individually to a cellulose acylate dope.

<Additives Other than Sugar Ester Compound>

(1) Plasticizer Other than Sugar Ester Compound

The cellulose acylate film according to the invention preferably contains at least one hydrophobizing agent selected from a polyhydric alcohol ester hydrophobizing agent, a polycondensation ester hydrophobizing agent and a carbohydrate derivative hydrophobizing agent. The hydrophobizing agent is preferably that capable of reducing the water content of the film while suppressing decrease in the glass transition temperature thereof as small as possible. By using the hydrophobizing agent, the phenomenon in that the additives in the cellulose acylate film diffuse into the polarizer layer under high temperature and high humidity conditions is restrained to prevent the degradation of the polarizer performance.

(Polyhydric Alcohol Ester Hydrophobizing Agent)

The polyhydric alcohol is represented by formula (A) shown below.

$$R^{31}-(OH)_n \quad \text{Formula (A)}$$

(wherein $R^{31}$ represents an n-valent organic group, and n represents a positive integer of 2 or more.)

Preferred examples of the polyhydric alcohol are set forth below, but the invention should not be construed as being limited thereto. Specifically, preferred examples thereof include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol. In particular, triethylene glycol, tetraethylene glycol, dipropylene glycol, tripropylene glycol, sorbitol, trimethylolpropane and xylitol are preferred.

Of the polyhydric alcohol ester hydrophobizing agents, a polyhydric alcohol ester using a polyhydric alcohol having 5 or more carbon atoms is preferred. A polyhydric alcohol having 5 to 20 carbon atoms is particularly preferred.

A monocarboxylic acid for use in the polyhydric alcohol ester is not particularly restricted, and known aliphatic monocarboxylic acid, alicyclic monocarboxylic acid or aromatic monocarboxylic acid is used. Use of the alicyclic monocarboxylic acid or aromatic monocarboxylic acid is preferred in view of improving the moisture permeability and moisture retentivity.

Preferred examples of the monocarboxylic acid used in the polyhydric alcohol ester are set forth below, but the invention should not be construed as being limited thereto.

The aliphatic monocarboxylic acid used is preferably a straight-chain or branched fatty acid having from 1 to 32 carbon atoms, more preferably a straight-chain or branched fatty acid having from 1 to 20 carbon atoms, and particularly preferably a straight-chain or branched fatty acid having from 1 to 10 carbon atoms. To incorporate acetic acid is preferred because the compatibility with the cellulose derivative is increased. It is also preferred to use acetic acid together with other monocarboxylic acid.

Preferred examples of the aliphatic monocarboxylic acid include a saturated fatty acid, for example, acetic acid, propionic acid, butyric acid, valeric acid, caproic acid, enanthic acid, caprylic acid, pelargonic acid, caprylic acid, 2-ethylhexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotinic acid, heptacosanoic acid, montanic acid, melissic acid or lacceric acid, and an unsaturated fatty acid, for example, undecylenic acid, oleic acid, sorbic acid, linolic acid, linolenic acid or arachidonic acid.

Preferred examples of the alicyclic monocarboxylic acid include cyclopentanecarboxylic acid, cyclohexanecarboxylic acid, cyclooctanecarboxylic acid, and derivatives thereof.

Preferred examples of the aromatic monocarboxylic acid include benzoic acid, an acid prepared by introducing an alkyl group into the benzene ring of benzoic acid, for example, toluic acid, an aromatic monocarboxylic acid having two or more benzene rings, for example, biphenylcarboxylic acid, naphthalenecarboxylic acid or tetralincarboxylic acid, and derivatives thereof. In particular, benzoic acid is preferred.

A molecular weight of the polyhydric alcohol ester hydrophobizing agent is not particularly restricted, and is preferably from 300 to 3,000, and more preferably from 350 to 1,500. The polyhydric alcohol ester hydrophobizing agent having a larger molecular weight is preferred because it hardly volatilizes. On the other hand, the polyhydric alcohol ester hydrophobizing agent having a smaller molecular weight is preferred in view of the moisture permeability and the compatibility with the cellulose derivative.

The carboxylic acids for the polyhydric alcohol ester may be used individually or as a mixture of two or more thereof. The hydroxy groups in the polyhydric alcohol may be fully esterified, or a part of the hydroxyl group may be remained as it is.

Specific examples of the polyhydric alcohol ester are set forth below.

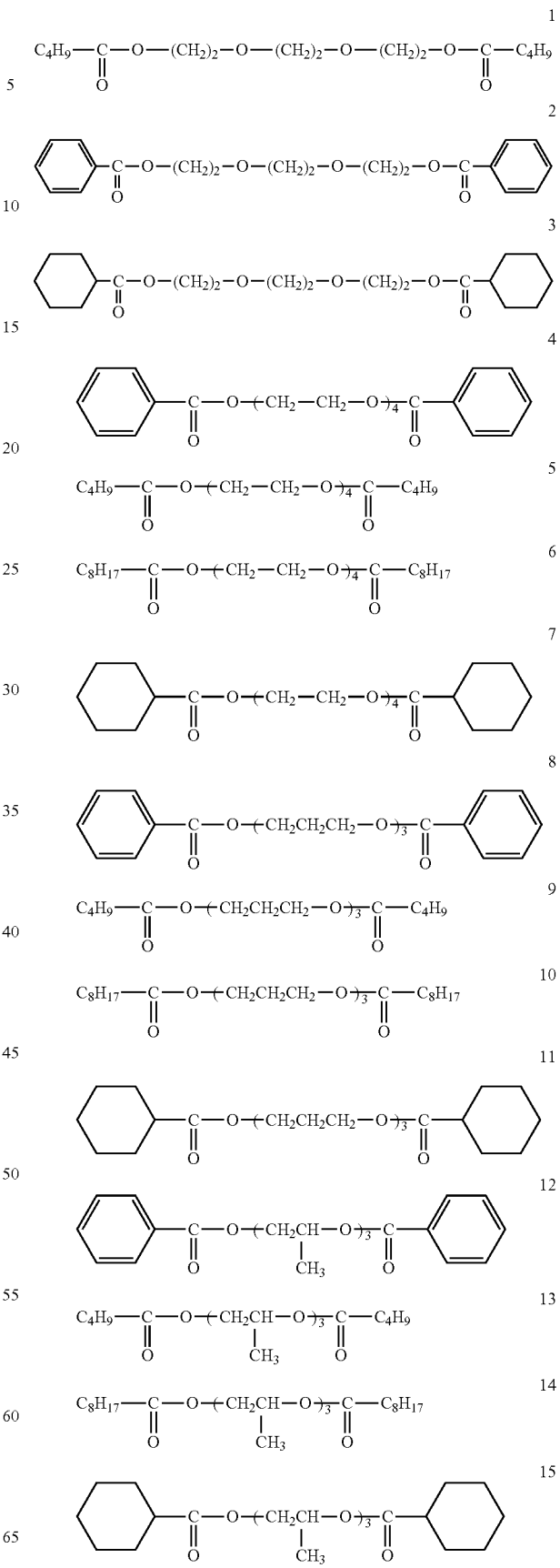

16
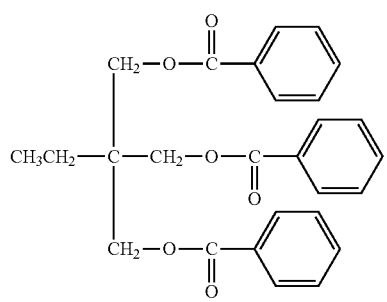
17
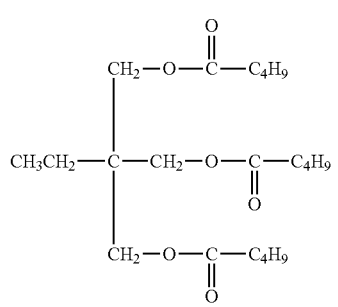
18
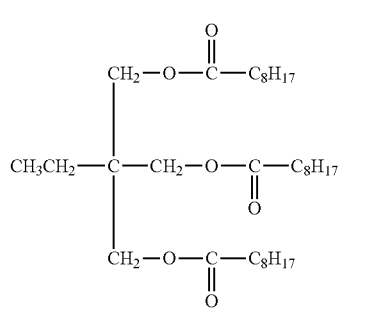
19
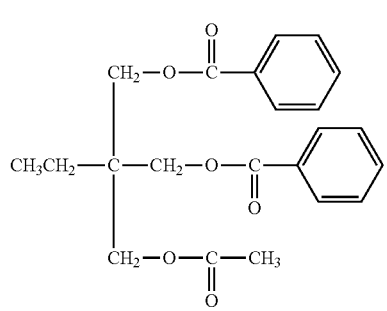
20
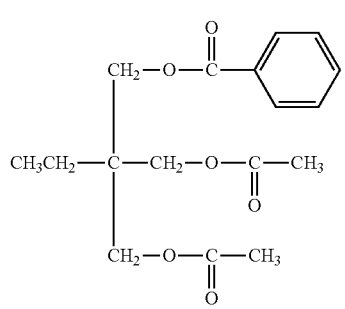
21
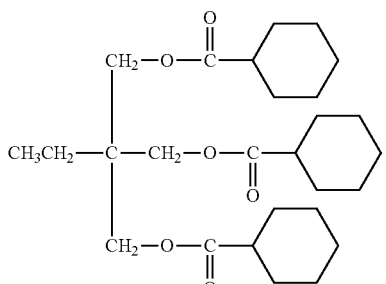
22
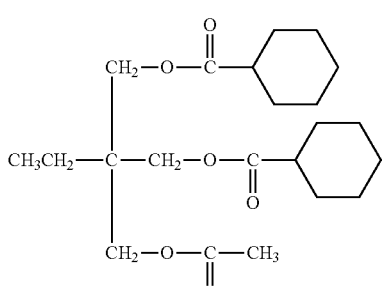
23
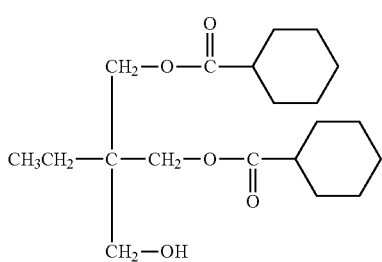
24
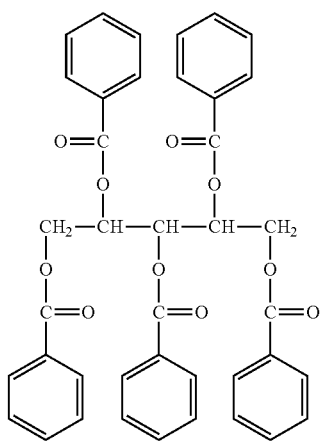

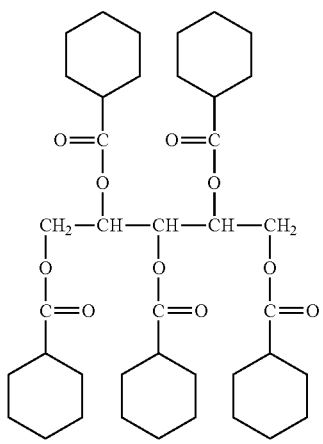
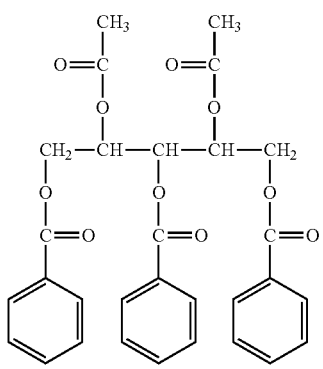
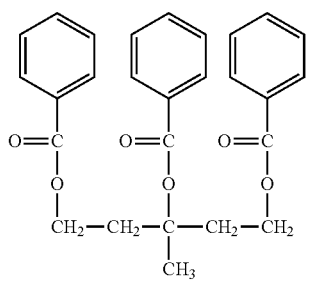
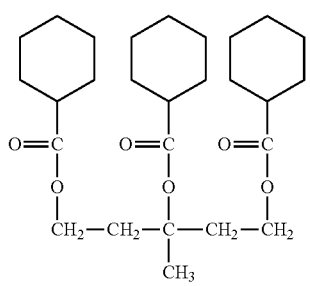
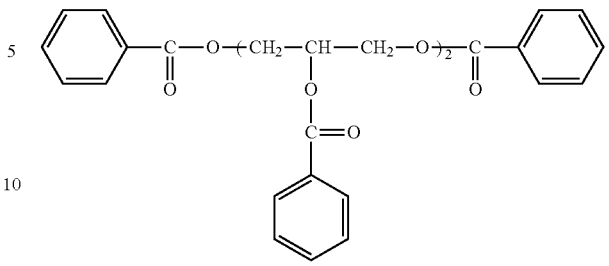
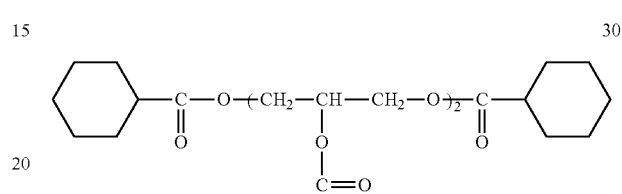
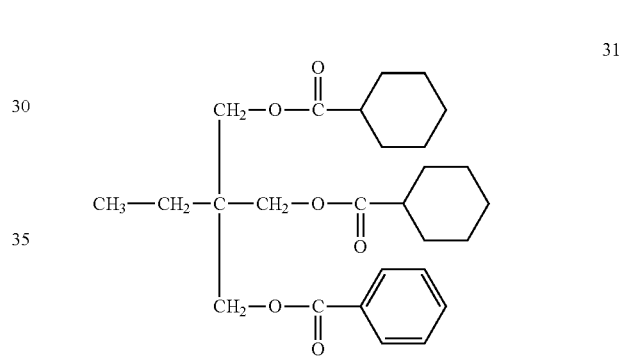
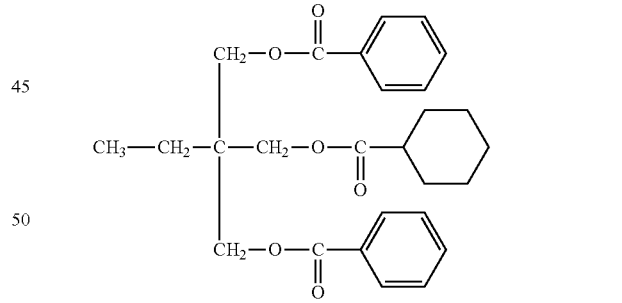
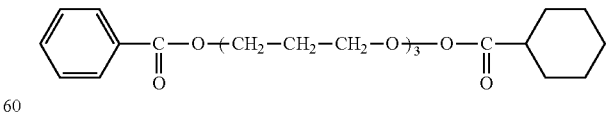
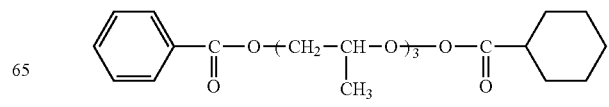

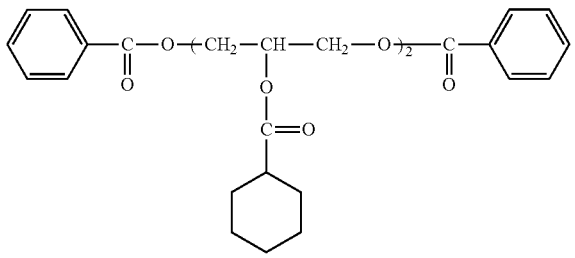

(Polycondensation Ester Hydrophobizing Agent)

It is preferred that the polycondensation ester hydrophobizing agent is obtained from at least one dicarboxylic acid having an aromatic ring (also referred to as an aromatic dicarboxylic acid) and at least one aliphatic diol having an average carbon number from 2.5 to 8.0. It is also preferred that the polycondensation ester hydrophobizing agent is obtained from a mixture of at least one aromatic dicarboxylic acid and at least one aliphatic dicarboxylic acid and at least one aliphatic diol having an average carbon number from 2.5 to 8.0.

The calculation of the average carbon number of dicarboxylic acid residue is performed separately from that of diol residue.

A value obtained through calculation by multiplying a composition ratio (molar fraction) of the dicarboxylic acid residue by a constituent carbon number is defined as the average carbon number. For example, in the case of being constituted of 50% by mole of an adipic acid residual and 50% by mole of a phthalic acid residue, the average carbon number is 7.0.

The case of diol residue is also the same as above, and a value obtained through calculation by multiplying a composition ratio (molar fraction) of the diol residue by a constituent carbon number is defined as the average carbon number of the diol residue. For example, in the case of being constituted of 50% by mole of an ethylene glycol residue and 50% by mole of a 1,2-propanediol residue, the average carbon number is 2.5.

A number average molecular weight of the polycondensation ester is preferably from 500 to 2,000, more preferably from 600 to 1,500, and still more preferably from 700 to 1,200. When the number average molecular weight of the polycondensation ester is 500 or more, the volatility is low so that film failure or process contamination by volatilization under a high temperature condition at the time of stretching of the cellulose ester film hardly occurs. Also, when the number average molecular weight of the polycondensation ester is 2,000 or less, the compatibility with the cellulose acylate is high so that bleeding out at the time of film formation and at the time of heat stretching hardly occurs.

The number average molecular weight of the polycondensation ester can be measured and evaluated by gel permeation chromatography. In the case of a polyesterpolyol whose terminal is not sealed, the number average molecular weight thereof can also be calculated from an amount of the hydroxy group per weight (hereinafter, also referred to as "hydroxy value"). The hydroxy value as used herein is a value obtained by acetylating the polyesterpolyol and then measuring an amount (mg) of potassium hydroxide necessary for neutralizing excessive acetic acid.

In the case where a mixture of an aromatic dicarboxylic acid and an aliphatic dicarboxylic acid is used as the dicarboxylic acid component, an average carbon number of the dicarboxylic acid is preferably from 5.5 to 10.0, and more preferably from 5.6 to 8.

When the average carbon number of the dicarboxylic acid is 5.5 or more, a polarizing plate having excellent durability can be obtained. When the average carbon number of the dicarboxylic acid is 10 or less, the compatibility with the cellulose acylate is excellent so that the generation of bleeding out in a film formation process of the cellulose acylate film can be restrained.

The polycondensation ester obtained from a diol and a dicarboxylic acid containing an aromatic dicarboxylic acid includes the aromatic dicarboxylic acid residue.

In the specification, the residue means a partial structure of the polycondensation ester and represents a partial structure having a feature of a monomer which forms the polycondensation ester. For example, a dicarboxylic acid residue which is formed from a dicarboxylic acid of HOOC—R—COOH is —OC—R—CO—.

A ratio of the aromatic dicarboxylic acid residue of the polycondensation ester is preferably 40% by mole or more, and more preferably from 40 to 95% by mole.

When the ratio of the aromatic dicarboxylic acid residue of the polycondensation ester is 40% by mole or more, a cellulose acylate film having a sufficient optical anisotropy is obtained, and a polarizing plate having an excellent durability is obtained. Also, when the ratio of the aromatic dicarboxylic acid residue of the polycondensation ester is 95% by mole or less, the compatibility with the cellulose acylate is excellent so that the bleeding out at the time of film formation and even at the time of heat stretching of the cellulose acylate film can be made to hardly occur.

As the aromatic dicarboxylic acid which is used for the formation of the polycondensation ester hydrophobizing agent, for example, phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid and 2,6-naphthalenedicarboxylic acid are exemplified. Of the aromatic dicarboxylic acids, phthalic acid, terephthalic acid and 2,6-naphthalenedicarboxylic acid are preferred, phthalic acid and terephthalic acid are more preferred, and terephthalic acid is still more preferred.

In the polycondensation ester, the aromatic dicarboxylic acid residue is formed derived from the aromatic dicarboxylic acid used in the mixing.

Specifically, the aromatic dicarboxylic acid residue preferably contains at least one of a phthalic acid residue, a terephthalic acid residue and an isophthalic acid residue, more preferably contains at least one of a phthalic acid residue and a terephthalic acid residue, and still more preferably contains a terephthalic acid residue.

When terephthalic acid is used as the aromatic dicarboxylic acid in the mixture of the formation of polycondensation ester, the compatibility with the cellulose acylate is excellent so that a cellulose acylate film in which the bleeding out hardly occurs even at the time of film formation and even at the time of heat stretching of the cellulose acylate film can be formed. Also, the aromatic dicarboxylic acids may be used one kind or in combination of two or more kinds thereof. In the case of using two kinds of aromatic dicarboxylic acids, it is preferred to use phthalic acid and terephthalic acid.

The combination use of two kinds of aromatic dicarboxylic acids of phthalic acid and terephthalic acid is preferred from the standpoint that the polycondensation ester can be softened at ordinary temperature and handling is easy.

A content of the terephthalic acid residue in the dicarboxylic acid residue of the polycondensation ester is preferably from 40 to 100% by mole.

When the content of the terephthalic acid residue is 40% by mole or more, a cellulose acylate film exhibiting a sufficient optical anisotropy is obtained.

The polycondensation ester obtained from a diol and a dicarboxylic acid containing an aliphatic dicarboxylic acid includes the aliphatic dicarboxylic acid residue.

As the aliphatic dicarboxylic acid which is used for the formation of the polycondensation ester hydrophobizing agent, for example, oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexanedicarboxylic acid are exemplified.

In the polycondensation ester, the aliphatic dicarboxylic acid residue derived from the aliphatic dicarboxylic acid used in the mixing is formed.

As to the aliphatic dicarboxylic acid residue, an average carbon number is preferably 5.5 to 10.0, more preferably from 5.5 to 8.0, and still more preferably from 5.5 to 7.0. When the average carbon number of the aliphatic dicarboxylic acid is 10.0 or less, a loss on heating of the compound can be reduced so that the occurrence of surface state failure which is considered to be caused due to process contamination by bleeding out at the time of drying of a cellulose acylate web can be prevented. Also, it is preferred that the average carbon number of the aliphatic dicarboxylic acid is 5.5 or more because the compatibility is excellent and the deposition of the polycondensation ester hardly occurs.

Specifically, the aliphatic dicarboxylic residue preferably contains a succinic acid residue, and in the case of using two kinds of aliphatic dicarboxylic residues, it is preferred to contain a succinic acid residue and an adipic acid residue.

Specifically, in the mixing for the formation of polycondensation ester, the aliphatic dicarboxylic acids may be used one kind or in combination of two or more kinds thereof. In the case of using two kinds of aliphatic dicarboxylic acids, it is preferred to use succinic acid and adipic acid. In the case of using one aliphatic dicarboxylic acid in the mixing for the formation of polycondensation ester, it is preferred to use succinic acid. In these cases, the average carbon number of the aliphatic dicarboxylic acid residue can be adjusted to a desired value and it is preferred from the standpoint of the compatibility with the cellulose acylate.

In the mixing for the formation of polycondensation ester, it is preferred to use two or three kinds of dicarboxylic acids. In the case of using two kinds of dicarboxylic acids, it is preferred to use one kind of each of an aliphatic dicarboxylic acid and an aromatic dicarboxylic acid. In the case of using three kinds of dicarboxylic acids, one kind of an aliphatic dicarboxylic acid and two kinds of aromatic dicarboxylic acids, or two kinds of aliphatic dicarboxylic acids and one kind of an aromatic dicarboxylic acid is used. This is because a value of the average carbon number of the dicarboxylic acid residue is easily adjusted, a content of the aromatic dicarboxylic acid residue can be made to fall within a preferred range, and the durability of a polarizer can be increased.

The polycondensation ester obtained from a diol and a dicarboxylic acid includes the diol residue.

In the specification, a diol residue which is formed from a diol of HO—R—OH is —O—R—O—.

The diol which forms the polycondensation ester includes an aromatic diol and an aliphatic diol, and it is preferred that the polycondensation ester for use as the hydrophobizing agent is formed from at least an aliphatic diol.

The polycondensation ester preferably contains an aliphatic diol residue having an average carbon number from 2.5 to 7.0, and more preferably contains an aliphatic diol residue having an average carbon number from 2.5 or 4.0. When the average carbon number of the aliphatic diol residue is 7.0 or less, the compatibility with the cellulose acetate is improved, the bleeding out hardly occurs, the loss on heating of the compound hardly increases, and the occurrence of surface state failure which is considered to be caused due to process contamination by bleeding out at the time of drying of a cellulose acylate web can be prevented. Also, when the average carbon number of the aliphatic diol residue is 2.5 or more, the synthesis is easy.

The aliphatic diol which can form the polycondensation ester polycondensation ester hydrophobizing agent preferably includes an alkyl diol and an alicyclic diol. For example, ethylene glycol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-diemthylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, diethylene glycol and cyclohexanedimethanol are preferred. It is preferred to use as a mixture of one or two or more kinds of the aliphatic diols together with ethylene glycol.

The aliphatic diol is preferably at least one of ethylene glycol, 1,2-propanediol and 1,3-propanediol, and particularly preferably at least one kind of ethylene glycol and 1,2-propanediol. In the case of using two kinds of the aliphatic diols to form the condensation ester, it is preferred to use ethylene glycol and 1,2-propanediol. By using 1,2-propanediol or 1,3-propanediol, crystallization of the polycondensation ester can be prevented.

In the polycondensation ester, the diol residue derived from the diol used in the mixing is formed.

Specifically, the polycondensation ester preferably contains as the diol residue, at least one of an ethylene glycol residue, a 1,2-propanediol residue and a 1,3-propanediol residue, and more preferably contains an ethylene glycol residue or a 1,2-propanediol residue.

In the aliphatic diol residue contained in the polycondensation ester, it is preferred to contain an ethylene glycol residue from 10 to 100% by mole, and more preferably from 20 to 100% by mole.

The terminal of the polycondensation ester may be the diol or carboxylic acid as it is without being sealed, or so-called sealing of the terminal may be conducted upon further reaction with a monocarboxylic acid or a monoalcohol.

The monocarboxylic acid which is used for the sealing is preferably acetic acid, propionic acid, butanoic acid, benzoic acid or the like. The monoalcohol which is used for the sealing is preferably methanol, ethanol, propanol, isopropanol, butanol, isobutanol or the like, and most preferably methanol. When a number of carbon atoms in the monocarboxylic acid which is used at the terminal of the polycondensation ester is 7 or less, the loss on heating of the compound does not become large, and the surface state failure does not occur.

It is more preferred that the terminal of the polycondensation ester is a diol residue exists as it is without being sealed or is sealed with acetic acid, propionic acid or benzoic acid.

It does not matter whether the both terminals of the polycondensation ester are sealed or unsealed.

In the case where the both terminals of the polycondensation ester are unsealed, the polycondensation ester is preferably a polyesterpolyol.

As one embodiment of the polycondensation ester, a polycondensation ester in which a carbon number of the aliphatic diol residue is from 2.5 to 8.0 and the both terminals of the polycondensation ester are unsealed is exemplified.

In the case where the both terminals of the polycondensation ester are sealed, it is preferred to seal the both terminals upon reaction with a monocarboxylic acid. At that time, the both terminals of the polycondensation ester are the monocarboxylic acid residues. In the specification, a monocarboxylic acid residue which is formed from a monocarboxylic acid of R—COOH is R—CO—. In the case where the both terminals of the polycondensation ester are sealed with a monocarboxylic acid, the monocarboxylic acid residue is preferably an aliphatic monocarboxylic acid residue, more preferably an aliphatic monocarboxylic acid residue having 22 or less carbon atoms, and still more preferably an aliphatic monocarboxylic acid residue having 3 or less carbon atoms. Also, the monocarboxylic acid residue is preferably an aliphatic monocarboxylic acid residue having 2 or more carbon atoms, and particularly preferably an aliphatic monocarboxylic acid residue having 2 carbon atoms.

As one embodiment of the polycondensation ester, a polycondensation ester in which a carbon number of the aliphatic diol residue is more than 2.5 to 7.0 and the both terminals of the polycondensation ester are sealed with a monocarboxylic acid is exemplified.

When the carbon number of the monocarboxylic acid residue at the both terminals of the polycondensation ester is 3 or less, the volatility is decreased, the loss on heating of the polycondensation ester does not become large, and it is possible to reduce the generation of process contamination and the occurrence of surface state failure.

Specifically, the monocarboxylic acid which is used for the sealing is preferably an aliphatic monocarboxylic acid, more preferably an aliphatic monocarboxylic acid having from 2 to 22 carbon atoms, still more preferably an aliphatic monocarboxylic acid having from 2 to 3 carbon atoms, and particularly preferably an aliphatic monocarboxylic acid having 2 carbon atoms.

For example, as the monocarboxylic acid, acetic acid, propionic acid, butanoic acid, benzoic acid and derivatives thereof are preferred, acetic acid and propionic acid are more preferred, and acetic acid is the most preferred.

The monocarboxylic acids used for sealing may be used as a mixture of two or more kinds thereof.

It is preferred that the both terminals of the polycondensation ester are sealed with acetic acid or propionic acid, and it is the most preferred that the both terminals of the polycondensation ester are an acetyl ester residue (sometimes referred to as "acetyl residue") upon being sealed with acetic acid.

In the case where the both terminals of polycondensation ester are sealed, the state at ordinary temperature hardly becomes in a solid form, handling is good, and a cellulose acylate film excellent in the humidity stability and durability of polarizing plate can be obtained.

Specific examples A-1 to A-34 of the polycondensation ester are set forth in Table 5 below, but the invention should not be construed as being limited thereto.

TABLE 5

| | Dicarboxylic acid | | | Diol | | | |
| --- | --- | --- | --- | --- | --- | --- | --- |
| | Aromatic Dicarboxylic Acid | Aliphatic Dicarboxylic Acid | Ratio of Dicarboxylic Acids (molar ratio) | Diol 1 | Diol 2 | Ratio of Diols (molar ratio) | Terminal Group |
| A-1 | TPA | SA | 45/55 | Ethanediol | Propanediol | 45/55 | Acetyl Ester Group |
| A-2 | TPA | SA | 50/50 | Ethanediol | Propanediol | 45/55 | Acetyl Ester Group |
| A-3 | TPA | SA | 55/45 | Ethanediol | Propanediol | 45/55 | Acetyl Ester Group |
| A-4 | TPA | SA | 65/35 | Ethanediol | Propanediol | 45/55 | Acetyl Ester Group |
| A-5 | TPA | SA | 55/45 | Ethanediol | Propanediol | 25/75 | Acetyl Ester Group |
| A-6 | TPA | SA | 55/45 | Ethanediol | Propanediol | 10/90 | Acetyl Ester Group |
| A-7 | 2,6-NPA | SA | 50/50 | Ethanediol | Propanediol | 45/55 | Acetyl Ester Group |
| A-8 | 2,6-NPA | SA | 50/50 | Ethanediol | Propanediol | 45/55 | Acetyl Ester Group |
| A-9 | TPA/PA | SA | 45/5/50 | Ethanediol | Propanediol | 45/55 | Acetyl Ester Group |
| A-10 | TPA/PA | SA | 40/10/50 | Ethanediol | Propanediol | 45/55 | Acetyl Ester Group |
| A-11 | TPA | SA/AA | 50/30/20 | Ethanediol | Propanediol | 45/55 | Acetyl Ester Group |
| A-12 | TPA | SA/AA | 50/20/30 | Ethanediol | Propanediol | 45/55 | Acetyl Ester Group |
| A-13 | TPA | SA | 50/50 | Ethanediol | Propanediol | 25/75 | Acetyl Ester Group |
| A-14 | TPA | SA | 55/45 | Ethanediol | Propanediol | 45/55 | Acetyl Ester Group |
| A-15 | TPA | SA | 55/45 | Ethanediol | Cyclohexanedimethanol | 45/55 | Acetyl Ester Group |
| A-16 | TPA | SA | 45/55 | Ethanediol | Propanediol | 45/55 | Hydroxy Group |
| A-17 | TPA | SA | 50/50 | Ethanediol | Propanediol | 45/55 | Hydroxy Group |
| A-18 | TPA | SA | 55/45 | Ethanediol | Propanediol | 45/55 | Hydroxy Group |

TABLE 5-continued

| | Dicarboxylic acid | | | Diol | | | |
|---|---|---|---|---|---|---|---|
| | Aromatic Dicarboxylic Acid | Aliphatic Dicarboxylic Acid | Ratio of Dicarboxylic Acids (molar ratio) | Diol 1 | Diol 2 | Ratio of Diols (molar ratio) | Terminal Group |
| A-19 | TPA | SA | 65/35 | Ethanediol | Propanediol | 45/55 | Hydroxy Group |
| A-20 | TPA | SA | 55/45 | Ethanediol | Propanediol | 25/75 | Hydroxy Group |
| A-21 | TPA | SA | 55/45 | Ethanediol | Propanediol | 10/90 | Hydroxy Group |
| A-22 | 2,6-NPA | SA | 50/50 | Ethanediol | Propanediol | 25/75 | Hydroxy Group |
| A-23 | 2,6-NPA | SA | 50/50 | Ethanediol | Propanediol | 25/75 | Hydroxy Group |
| A-24 | 2,6-NPA | SA | 45/5/50 | Ethanediol | Propanediol | 25/75 | Hydroxy Group |
| A-25 | 2,6-NPA | SA | 40/10/50 | Ethanediol | Propanediol | 25/75 | Hydroxy Group |
| A-26 | TPA | SA/AA | 50/30/20 | Ethanediol | Propanediol | 25/75 | Hydroxy Group |
| A-27 | TPA | SA/AA | 50/20/30 | Ethanediol | Propanediol | 25/75 | Hydroxy Group |
| A-28 | TPA | SA | 50/50 | Ethanediol | Propanediol | 25/75 | Hydroxy Group |
| A-29 | TPA | SA | 55/45 | Ethanediol | Propanediol | 25/75 | Hydroxy Group |
| A-30 | TPA | SA | 55/45 | Ethanediol | Cyclohexanedimethanol | 25/75 | Hydroxy Group |
| A-31 | TPA | SA | 55/45 | Ethanediol | Propanediol | 45/55 | Propionyl Ester Group |
| A-32 | TPA | — | 100/0 | Ethanediol | Propanediol | 50/50 | Hydroxy Group |
| A-33 | TPA | — | 100/0 | Ethanediol | Propanediol | 40/60 | Acetyl Ester Group |
| A-34 | TPA | SA | 50/50 | Ethanediol | Propanediol | 45/55 | Benzoyl Ester Group |

Abbreviations used in the Table 5 above indicate the compounds shown below, respectively. PA: phthalic acid, TPA: terephthalic acid, AA: adipic acid, SA: succinic acid, 2,6-NPA: 2,6-naphthalenedicarboxylic acid.

The polycondensation ester can be easily synthesizes according to any of a thermal fusion condensation method by a polyesterification reaction or ester exchange reaction of a diol with a dicarboxylic acid in a conventional manner and an interfacial condensation method of an acid chloride of the acid with a glycol. The polycondensation ester is described in detail in Koichi Mural ed., *Kasozai Sono Riron to Ovo (Plasticizer, Its Theory and Application)*, first edition, Saiwai Shobo Co., Ltd., (Mar. 1, 1973). The materials described, for example, in JP-A-5-155809, JP-A-5-155810, JP-A-5-197073, JP-A-2006-259494, JP-A-7-330670, JP-A-2006-342227 and JP-A-2007-003679 are also utilized.

The amount of the hydrophobizing agent added is preferably from 1 to 20% by weight respective to the cellulose acylate. When the amount of the hydrophobizing agent is 1% by weight or more, the effect of improving polarizer durability is apt to be obtained. Also, the amount of the hydrophobizing agent is 20% by weight or less, the bleeding out hardly occurs. The amount of the hydrophobizing agent added is more preferably from 2 to 15% by weight, and particularly preferably from 5 to 15% by weight.

The timing when the hydrophobizing agent is added to the cellulose acylate film is not particularly restricted as long as it has been added thereto at the time of film formation. For example, it may be added at the time of synthesis of cellulose acylate, or it may be mixed with the cellulose acylate at the time of preparation of dope.

(2) Retardation Developer

The film according to the invention may contain a retardation developer. By employing the retardation developer, a high Re developing property is obtained at a low draw ratio. The kind of the retardation developer is not particularly defined. The retardation developer includes a rod-shaped or discotic compound and a compound having a retardation developing property of the non-phosphate ester compounds described above. Of the rod-shaped or discotic compounds, those having at least two aromatic rings are preferably used as the retardation developer.

Two or more retardation developers may be used in combination.

It is preferred that the retardation developer has an absorption maximum in a wavelength range from 250 to 400 nm and substantially do not have absorption in a visible region.

As the retardation developer, for example, compounds described in JP-A-2004-50516 and JP-A-2007-86748 can be used, but the invention should not be construed as being limited thereto.

As the discotic compound, for example, compounds described in EP-A-0911656, triazine compounds described in JP-A-2003-344655 and triphenylene compounds described in paragraphs [0097] to [0108] of JP-A-2008-150592 are also preferably used.

The discotic compound can be synthesized according to a known method, for example, method described in JP-A-2003-344655 or method described in JP-A-2005-134884.

In addition to the discotic compound described above, the rod-shaped compound having a linear molecular structure is also preferably used, and for example, rod-shaped compounds described in paragraphs [0110] to [0127] of JP-A-2008-150592 are preferably preferred.

(3) Acrylic Polymer

An acrylic polymer having a weight average molecular weight from 500 to 10,000 may be further added to the cellulose acylate film according to the invention. Preferably, the weight average molecular weight of the acrylic polymer is from 500 to 5,000.

By adding the acrylic polymer, the cellulose acylate film formed is excellent in transparency, has an extremely low moisture permeability and exhibits the excellent characteristics as a protective film for polarizing plate. As to the acrylic polymer, compounds described in WO 2008/126535 are preferably used.

(4) Antioxidant and Thermal Degradation Inhibitor

In the invention, as the antioxidant and thermal degradation inhibitor, those conventionally know can be used. In particular, a lactone compound, a sulfur compound, a phenol compound, a double bond-containing compound, a hindered amine compound and a phosphorus compound are preferably used. As to the antioxidant and the thermal degradation inhibitor, compounds described in WO 2008/126535 are preferably used.

(5) Coloring Agent

In the invention, a coloring agent may be used. The coloring agent ordinarily means a dye or pigment, but in the invention it indicates a substance having an effect of making tone of liquid crystal display bluish, an effect of controlling the yellow index or an effect of reducing the haze. As to the coloring agent, compounds described in WO 2008/126535 are preferably used.

(6) Fine Particle

Examples of the fine particle for use in the invention include an inorganic compound, for example, silicon dioxide, titanium dioxide, aluminum oxide, zirconium oxide, calcium carbonate, talc, clay, calcined kaolin, calcined calcium silicate, calcium silicate hydrate, aluminum silicate, magnesium silicate and calcium phosphate.

The fine particle containing silicon is preferred because the haze becomes low, and silicon dioxide is particularly preferred.

An average particle size of primary particle of the fine particle is preferably from 5 to 50 nm, and more preferably from 7 to 20 nm. The fine particle is preferably included as a secondary aggregate having a particle size from 0.05 to 0.3 µm.

The content of the fine particle in the cellulose acylate film is preferably from 0.05 to 1% by weight, and particularly preferably from 0.1 to 0.5% by weight. In the case of a cellulose acylate film of a multilayer structure formed by a co-casting method, it is preferred that the fine particle in the amount described above is included in the surface layer.

Fine particles of silicon dioxide are marketed under trade names, for example, AEROSIL R972, R972V, R974, R812, 200, 200V, 300, R202, OX50, TT600 and NAX50 (produced by Nippon Aerosil CO., Ltd.) and they can be employed.

Fine particles of zirconium oxide are marketed under trade names, for example, AEROSIL R976 and R811 (produced by Nippon Aerosil CO., Ltd.) and they can be used.

Examples of polymer fine particle include, for example, a silicone resin, a fluorine resin and an acrylic resin. The silicone resin is preferred, and a silicone resin having a three-dimensional network structure is particularly preferred. It is marketed under trade names, for example, TOSPEARL 103, 105, 108, 120, 145, 3120 and 240 (produced by Toshiba Silicone Co., Ltd.) and they can be used.

Among them, AEROSIL 200V and AEROSIL R972V are particularly preferably used, because they exert a large effect of decreasing a friction coefficient while maintaining the haze of the cellulose acylate film at a low level.

(7) Other Additives

Into the cellulose acylate film according to the invention, other additives which are added to an ordinary cellulose acylate film may be incorporated in addition to the compounds described above.

Such other additives include, for example, an ultraviolet absorber.

As to the other additives, compounds described in WO 2008/126535 are preferably used.

<Method of Producing Cellulose Acylate Film Base Material>

The method of producing a cellulose acylate film base material according to the invention is not particularly restricted, and the film can be formed using a known method. Specifically, a film containing cellulose acylate can be formed utilizing a solution casting film-forming method or a melting film-forming method. From the standpoint of improving the surface state of film, the method of producing a film according to the invention preferably includes a step of forming the film containing cellulose acylate by the solution casting film film-forming method.

The method of producing a film according to the invention is described below with reference to a case using the solution casting film-forming method, but the invention should not be construed as being limited to the solution casting film-forming method. In the case of using the solution casting film-forming method as the method of producing a film according to the invention, a known method can be employed.

(Thickness)

The thickness of the cellulose acylate film according to the invention is preferably from 20 to 200 µm, more preferably from 20 to 85 µm, and still more preferably from 25 to 65 µm. When the thickness is 20 µm or more, the handling property is good, the mechanical strength of the film is not insufficient and the failure, for example, break of the film at the production hardly occurs, and the surface state of film is excellent.

[Antistatic Hardcoat Layer]

The optical film according to the invention has an antistatic hardcoat layer formed from a coating composition containing at least an organic antistatic agent and a curable compound having a (meth)acryloyl group in its molecule.

<Organic Antistatic Agent>

The organic antistatic agent according to the invention is preferably a conductive polymer. The conductive polymer includes an ion conductive compound (ion conductive polymer) and an electron conductive compound (electron conductive polymer). From the standpoint of less occurrence of bleeding out, high solubility in conventional organic solvent and excellent antistatic property in comparison with a monomer type compound or surfactant type compound, the ion conductive polymer is preferred.

(a. 1) Ion Conductive Compound

The ion conductive compound includes, for example, cationic, anionic and amphoteric ion conductive compounds.

Of the ion conductive compounds, the cationic or anionic compound which easily achieves the effect of the invention is preferred, and particularly, a quaternary ammonium salt group-containing polymer (cationic compound) is suitable from the standpoint of the high antistatic property of the compound.

As the quaternary ammonium salt group-containing polymer, any of a low molecular weight type and a high molecular weight type may be used, and a high molecular weight type cationic antistatic agent is more preferably used because the fluctuation of antistatic property resulting, for example, from bleeding out is prevented.

The high molecular weight type cationic compound having a quaternary ammonium salt group is used by appropriately selecting from known compounds, and a polymer having at least one unit selected from the structural units represented by formulae (I) to (III) shown below is preferred from the standpoint of high ionic conductivity.

Formula (I):

$$\left( \begin{array}{c} \text{CH} - \text{C} \\ | \quad\quad | \\ Y \quad (L)_{\overline{p}}(J)_{\overline{q}}Q \end{array} \begin{array}{c} R_1 \\ \end{array} \right)$$

In formula (1), $R_1$ represents a hydrogen atom, an alkyl group, a halogen atom or a $—CH_2COO^-M^+$, Y represents a hydrogen atom or a $—COO^-M^+$, $M^+$ represents a proton or a cation, L represents —CONH—, —COO—, —CO— or —O—, J represents an alkylene group, an arylene group or a group formed by combination of these groups, and Q represents a group selected from Group A shown below.

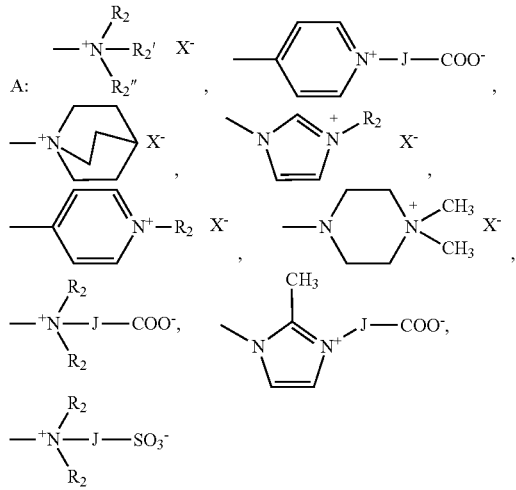

In the formulae above, $R_2$, $R_2'$ and $R_2''$ each independently represents an alkyl group, J represents an alkylene group, an arylene group or a group formed by combination of these groups, $X^-$ represents an anion, and p and q each independently represents 0 or 1.

Formula (II):

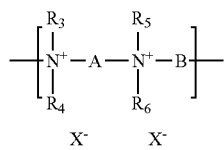

Formula (III):

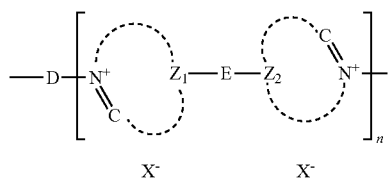

In formulae (II) and (III), $R_3$, $R_4$, $R_5$ and $R_6$ each independently represents an alkyl group, or $R_3$ and $R_4$ or $R_5$ and $R_6$ may be connected with each other to form a nitrogen-containing hetero ring.

A, B and D each independently represents an alkylene group, an arylene group, an alkenylene group, an arylenealkylene group, —$R_7COR$—, —$R_9COOR_{10}OCOR_{11}$—, —$R_{12}OCOR_{13}COOR_{14}$—, —$R_{15}$—$(OR_{16})_m$—, —$R_{17}CONHR_{18}NHCOR_{19}$—, —$R_{20}OCONHR_{21}NHCOR_{22}$— or —$R_{23}NHCONHR_{24}NHCONHR_{25}$—. E represents a single bond, an alkylene group, an arylene group, an alkenylene group, an arylenealkylene group, —$R_7COR_8$—, —$R_9COOR_{10}OCOR_{11}$—, —$R_{12}OCOR_{13}COOR_{14}$—, —$R_{15}$—$(OR_{16})_m$—, —$R_{17}CONHR_{18}NHCOR_9$—, —$R_{20}OCONHR_{21}NHCOR_{22}$—, —$R_{23}NHCONHR_{24}NHCONHR_{25}$— or —NHCOR_{26}CONH—. $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$, $R_{25}$ and $R_{26}$ each independently represents an alkyl group. $R_{10}$, $R_{13}$, $R_{18}$, $R_{21}$ and $R_{24}$ each independently represents a connecting group selected from an alkylene group, an alkenylene group, an arylene group, an arylenealkylene group and alkylenearylele group. m represents a positive integer from 1 to 4. $X^-$ represents an anion.

$Z_1$ and $Z_2$ each represents a nonmetallic atomic group necessary for forming a 5-membered or 6-membered ring together with the —N═C— group and may be connected to E in the form of a quaternary salt of ═N$^+$[X$^-$]—.

n represents an integer from 5 to 300.

The groups in formulae (I) to (III) are described in detail below.

The halogen atom includes a chlorine atom and a bromine atom and is preferably a chlorine atom.

The alkyl group is preferably a branched or a straight-chain alkyl group having from 1 to 4 carbon atoms, and more preferably a methyl group, an ethyl group or a propyl group.

The alkylene group is preferably an alkylene group having from 1 to 12 carbon atoms, more preferably a methylene group, an ethylene group or a propylene group, and particularly preferably an ethylene group.

The arylene group is preferably an arylene group having from 6 to 15 carbon atoms, more preferably a phenylene group, a diphenylene group, a phenylmethylene group, a phenyldimethylene group or a naphthylene group, and particularly preferably a phenymethylene group. These groups may have a substituent.

The alkenylene group is preferably an alkylene group having from 2 to 10 carbon atoms and the arylenealkylene group is preferably an arylenealkylene group having from 6 to 12 carbon atoms. These groups may have a substituent.

The substituent which may be present on each group includes, for example, a methyl group, an ethyl group and a propyl group.

In formula (I), $R_1$ is preferably a hydrogen atom.

Y is preferably a hydrogen atom.

J is preferably a phenymethylene group.

Q is preferably a group represented by formula (VI) shown below selected from Group A wherein $R_2$, $R_2'$ and $R_2''$ each independently represents a methyl group.

$X^-$ represents, for example, a halide ion, a sulfonic acid anion or a carboxylic acid anion, preferably a halide ion, and more preferably a chloride ion.

p and q is each preferably 0 or 1, and more preferably p is 0 and q is 1.

Formula (VI):

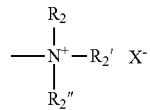

In formulae (II) and (III), $R_3$, $R_4$, $R_5$ and $R_6$ each preferably represents a substituted or unsubstituted alkyl group having from 1 to 4 carbon atoms, more preferably a methyl group or an ethyl group, and particularly preferably a methyl group.

A, B and D each independently preferably represents a substituted or unsubstituted alkylene group having from 2 to 10 carbon atoms, an arylene group, an alkenylene group or an arylenealkylene group, and more preferably a phenyldimethylene group.

X⁻ represents, for example, a halide ion, a sulfonic acid anion or a carboxylic acid anion, preferably a halide ion, and more preferably a chloride ion.

E preferably represents a single bond, an alkylene group, an arylene group, an alkenylene group or an arylenealkylene group.

The 5-membered or 6-membered ring formed by $Z_1$ or $Z_2$ together with the —N=C— group includes, for example, a diazoniabicyclooctane ring.

Specific examples of the compound having a structural unit represented by any one of formulae (I) to (III) are set forth below, but the invention should not be construed as being limited thereto. Of the suffixes (m, x, y, z, r and numeral numbers) shown in the specific examples, m represents a number of repeating units of each unit, and x, y, z and r each represents a molar ratio of each unit.

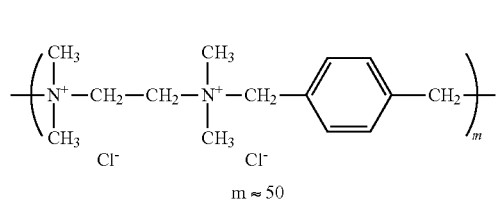

IP-1

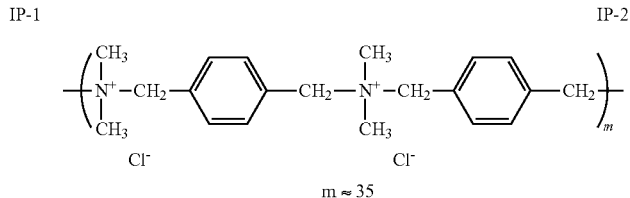

IP-2

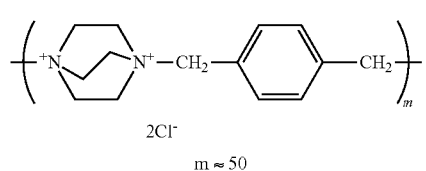

IP-3

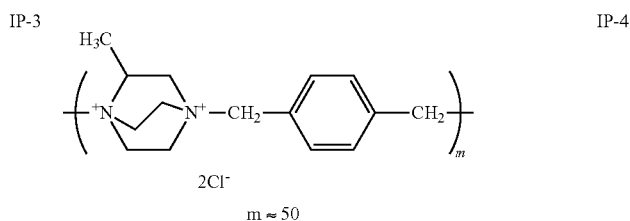

IP-4

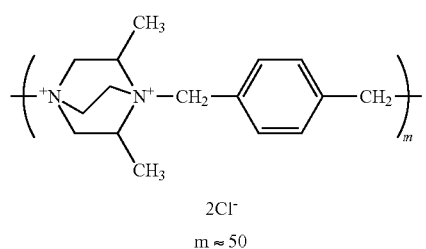

IP-5

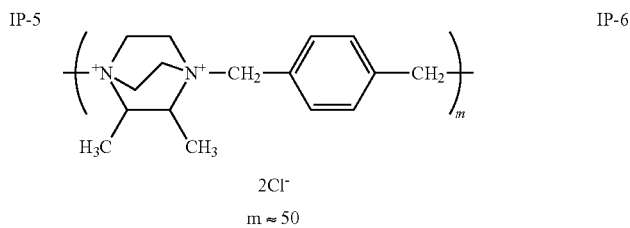

IP-6

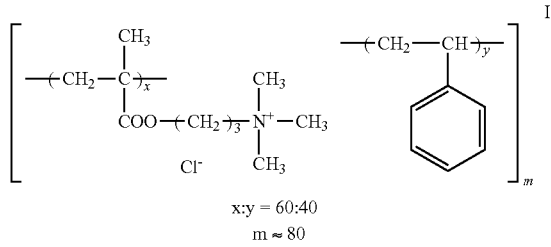

IP-7

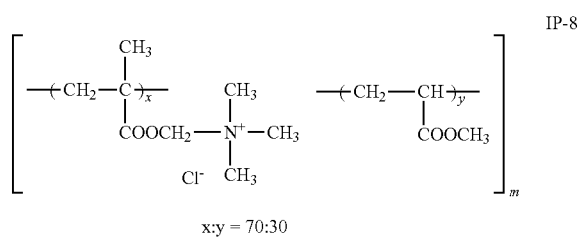

IP-8

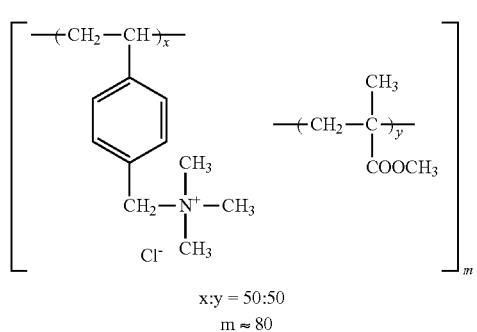

IP-9

-continued

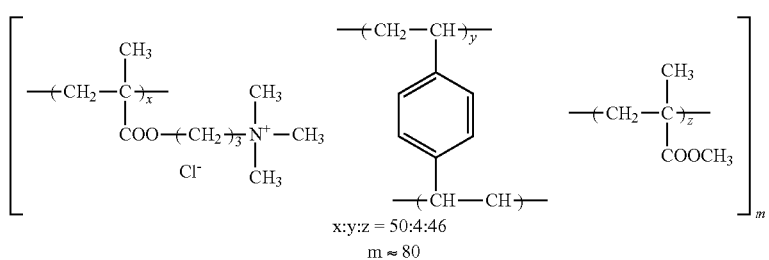

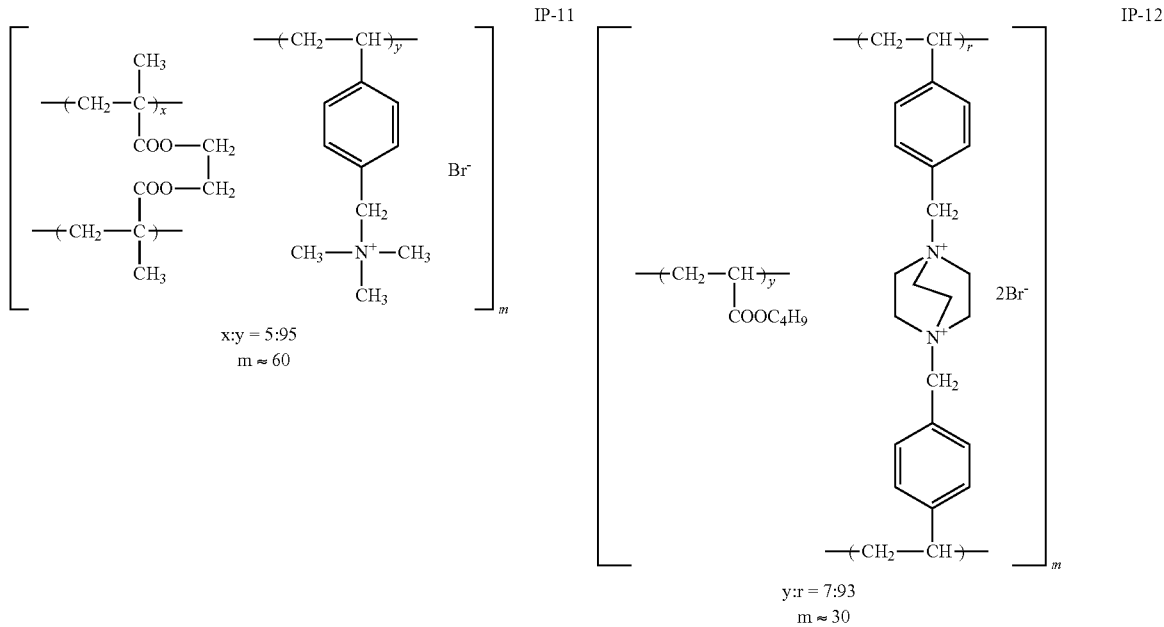

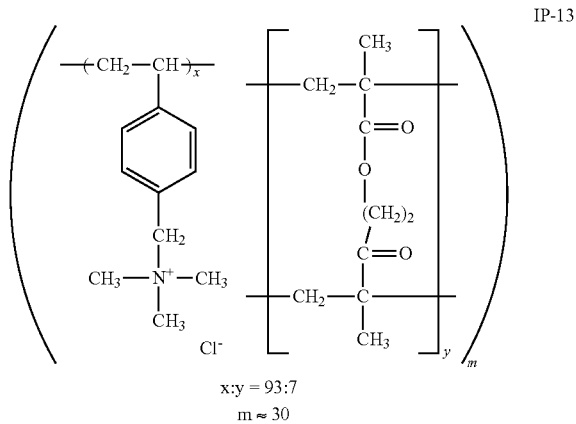

The conductive compounds described above may be used individually or in combination of two or more thereof. The antistatic compound having a polymerizable group in a molecule of an antistatic agent is more preferred because it can also increase the scratch resistance (film strength) of the antistatic hardcoat layer.

As the ion conductive compound, commercially available products may also be used. For example, LIODURAS LAS-1211 (produced by Toyo Ink Mfg. Co., Ltd.), SHIKOH UV-AS-102 (produced by The Nippon Synthetic Chemical Industry Co., Ltd.) and ASC-209P (produced by Kyoeisha Chemical Co., Ltd.) are exemplified.

The quaternary ammonium salt group-containing polymer which is suitably used as the ion conductive compound may have a polymerization unit other than the structural unit represented by formulae (I) to (III) (ionic structural unit).

Examples of the monomer which can be used as a polymerization unit other than the ionic structural unit include the following compounds.

<(a-2) Compound Having Alkylene Oxide Chain>

By virtue of having a structural unit other than the ionic structural unit, the ion conductive compound can increase the solubility in a solvent and the compatibility with a compound having an unsaturated double bond or a photopolymerization initiator at the preparation of the composition. In particular, it is preferred that the ion conductive compound has an alkylene oxide chain.

The compound (a-2) having an alkylene oxide chain is represented by formula (2) shown below and can be obtained, for example, by ring-opening polymerization of ethylene oxide with an alkyl alcohol and then ester exchange reaction with methyl(meth)acrylate or reaction with (meth)acrylic acid chloride.

$$CH_2=C(R^5)COO(AO)_nR^6 \qquad \text{Formula (2)}$$

In formula (2), $R^5$ represents H or $CH_3$, $R^6$ represents a hydrogen atom or a hydrocarbon group having from 1 to 22 carbon atoms, n represents an integer from 2 to 200, and A represents an alkylene group having from 2 to 4 carbon atoms.

In formula (2), the alkylene oxide group (AO) is an alkylene oxide group having from 2 to 4 carbon atoms, and examples thereof include an ethylene oxide group, a propylene oxide group and a butylene oxide group. Also, alkylene oxide groups having different carbon numbers may be present in the same monomer.

The number (n) of alkylene oxide groups is an integer from 2 to 200, and preferably an integer from 10 to 100. When the number is 1 or less or 201 or more, a sufficient compatibility with the compound having an unsaturated double bond described hereinafter may not be obtained in some cases.

$R^6$ is a hydrogen or a hydrocarbon group having from 1 to 22 carbon atoms. When the carbon number is 23 or more, since the raw materials are expensive, it is not practical.

As the hydrocarbon group having from 1 to 22 carbon atoms, a substituted or unsubstituted hydrocarbon group may be selected, an unsubstituted hydrocarbon group is preferred, and an unsubstituted alkyl group is more preferred. As the unsubstituted alkyl group, an alkyl group having or not having a branch may be used. Two or more kinds thereof may be used in combination.

Specific examples of the compound (a-2) having an alkylene oxide chain include polyethylene glycol mono(meth)acrylate, polypropylene glycol mono(meth)acrylate, polybutylene glycol mono(meth)acrylate, poly(ethylene glycol-propylene glycol) mono(meth)acrylate, poly(ethylene glycol-tetramethylene glycol) mono(meth)acrylate, poly(propylene glycol-tetramethylene glycol) mono(meth)acrylate, polyethylene glycol mono(meth)acrylate monomethyl ether, polyethylene glycol mono(meth)acrylate monobutyl ether, polyethylene glycol mono(meth)acrylate monooctyl ether, polyethylene glycol mono(meth)acrylate monobenzyl ether, polyethylene glycol mono(meth)acrylate monophenyl ether, polyethylene glycol mono(meth)acrylate monodecyl ether, polyethylene glycol mono(meth)acrylate monododecyl ether, polyethylene glycol mono(meth)acrylate monotetradecyl ether, polyethylene glycol mono(meth)acrylate monohexadecyl ether, polyethylene glycol mono(meth)acrylate monooctadecyl ether, poly(ethylene glycol-propylene glycol) mono(meth)acrylate octyl ether, poly(ethylene glycol-propylene glycol) mono(meth)acrylate octadecyl ether and poly(ethylene glycol-propylene glycol) mono(meth)acrylate nonylphenyl ether.

<(a-3) Compound Copolymerizable with Compound (a-2)>

Furthermore, compound (a-3) copolymerizable with compound (a-2) may be optionally radical-copolymerized, if desired.

The compound (a-3) copolymerizable with compound (a-2) is a compound having one ethylenically unsaturated group, and it is not particularly restricted and examples thereof include an alkyl(meth)acrylate, for example, methyl (meth)acrylate, ethyl(meth)acrylate, propyl(meth)acrylate, butyl(meth)acrylate, 2-ethylhexyl(meth)acrylate, dodecyl (meth)acrylate or octadecyl(meth)acrylate, a hydroxyalkyl (meth)acrylate, for example, hydroxyethyl(meth)acrylate, hydroxypropyl(meth)acrylate or hydroxybutyl(meth)acrylate, various (meth)acrylates, for example, benzyl(meth)acrylate, cyclohexyl(meth)acrylate, isobornyl(meth)acrylate, dicyclopentenyl(meth)acrylate, dicyclopentenyloxyethyl (meth)acrylate, ethoxyethyl(meth)acrylate, ethylcarbitol (meth)acrylate, butoxyethyl(meth)acrylate, cyanoethyl (meth)acrylate or glycidyl(meth)acrylate, styrene and methylstyrene.

(a. 2) Electron Conductive Compound

The electron conductive compound includes a compound of a non-conjugated polymer or conjugated polymer in which aromatic carbon rings or aromatic hetero rings are connected with single bonds or divalent or higher valent connecting groups. The electron conductive compound is preferably a polymer which exhibits an electrical conductivity of $10^{-6}$ $S \cdot cm^{-1}$ or more, and more preferably a polymer compound which has an electrical conductivity of $10^{-1}$ $S \cdot cm^{-1}$ or more.

The electron conductive polymer is preferably a non-conjugated polymer or conjugated polymer formed by connecting aromatic carbon rings or aromatic hetero rings with a single bond or a divalent or higher valent connecting group. The aromatic carbon ring in the non-conjugated polymer or conjugated polymer includes, for example, a benzene ring and the benzene ring may further form a condensed ring. The aromatic hetero ring in the non-conjugated polymer or conjugated polymer includes, for example, a pyridine ring, a pyrazine ring, a pyrimidine ring, a pyridazine ring, a triazine ring, an oxazole ring, a thiazole ring, an imidazole ring, an oxadiazole ring, a thiadiazole ring, a triazole ring, a tetrazole ring, a furan ring, a thiophene ring, a pyrrole ring, an indole ring, a carbazole ring, a benzimidazole ring and an imidazopyridine ring. The ring may further form a condensed ring and may have a substituent.

The divalent or higher valent connecting group in the non-conjugated polymer or conjugated polymer includes a connecting group formed, for example, from a carbon atom, a silicon atom, a nitrogen atom, a boron atom, an oxygen atom, a sulfur atom, metal and a metal ion, and preferably a group formed from a carbon atom, a nitrogen atom, a silicon atom, a boron atom, an oxygen atom, a sulfur atom and a combination thereof. Examples of the group formed by combination include a substituted or unsubstituted methylene group, a carbonyl group, an imino group, a sulfonyl group, a sulfinyl group, an ester group, an amido group and a silyl group.

Specific examples of the electron conductive polymer include conductive polyaniline, polyparaphenylene, polyparaphenylenevinylene, polythiophene, polyfuran, polypyrrole, polyselenophene, polyisothianaphthene, polyphenylene sulfide, polyacetylene, polypyridylvinylene, polyazine and derivatives thereof each of which may be substituted. The electron conductive polymers may be used individually or in combination of two or more thereof according to the purpose.

If the desired conductivity is achieved, it may be used in the form of a mixture with other polymer having no conductivity, and a copolymer of a monomer capable of forming the electron conductive polymer with other monomer having no conductivity may also be used.

The electron conductive polymer is more preferably a conjugated polymer. Examples of the conjugated polymer include polyacethylene, polydiacetylene, poly(paraphenylene), polyfluorene, polyazulene, poly(paraphenylene sulfide), polypyrrole, polythiophene, polyisothianaphthene, polyaniline, poly(paraphenylenevinylene), poly(2,5-thienylenevinylene), a multiple chain type conjugated polymer (for example, polyperinaphthalene), a metal phthalocyanine-type polymer, other conjugated polymer (for example, poly (paraxylylene) or poly[α-(5,5'-bithiophenediyl)benzylidene]) and derivatives thereof.

Preferably, poly(paraphenylene), polypyrrole, polythiophene, polyaniline, poly(paraphenylenevinylene), poly(2,5-thienylenevinylene) and derivatives thereof are exemplified, more preferably, polythiophene, polyaniline, polypyrrole and derivative thereof are exemplified, and still more preferably at least one of polythiophene and a derivative thereof is exemplified.

The conjugated polymer may have a substituent. Examples of the substituent which the conjugated polymer may have include substituents which are described as $R^{11}$ in formula (s1) shown below.

In particular, it is preferred that the electron conductive polymer has a partial structure represented by formula (s1) shown below (that is, polythiophene or derivative thereof) from the viewpoint of obtaining an optical film achieving both the high transparency and the antistatic property.

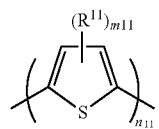

(s1)

In formula (s1), $R^{11}$ represents a substituent, and m11 represents an integer from 0 to 2. When m11 represents 2, plural $R^{11}$ may be the same or different and also may be connected with each other to form a ring. n11 represents an integer of 1 or more.

The substituent represented by $R^{11}$ includes an alkyl group (preferably having from 1 to 20 carbon atoms, more preferably having from 1 to 12 carbon atoms, still more preferably having from 1 to 8 carbon atoms, for example, methyl, ethyl, isopropyl, tert-butyl, n-octyl, n-decyl, n-hexadecyl, cyclopropyl, cyclopentyl or cyclohexyl), an alkenyl group (preferably having from 2 to 20 carbon atoms, more preferably having from 2 to 12 carbon atoms, particularly preferably having from 2 to 8 carbon atoms, for example, vinyl, allyl, 2-butenyl, 3-pentenyl, 2-hexenyl, 3-hexenyl, 4-hexenyl or 2-octenyl), an alkynyl group (preferably having from 2 to 20 carbon atoms, more preferably having from 2 to 12 carbon atoms, particularly preferably having from 2 to 8 carbon atoms, for example, propargyl or 3-pentynyl), an aryl group (preferably having from 6 to 30 carbon atoms, more preferably having from 6 to 20 carbon atoms, particularly preferably having from 6 to 12 carbon atoms, for example, phenyl, p-methylphenyl or naphthyl), an amino group (preferably having from 0 to 20 carbon atoms, more preferably having from 0 to 10 carbon atoms, particularly preferably having 0 to 6 carbon atoms, for example, amino, methylamino, dimethylamino, diethylamino, dibenzylamino or diphenylamino), an alkoxy group (preferably having from 1 to 20 carbon atoms, more preferably having from 1 to 12 carbon atoms, particularly preferably having 1 to 8 carbon atoms, for example, methoxy, ethoxy, butoxy, hexyloxy or octyloxy), an aryloxy group (preferably having from 6 to 20 carbon atoms, more preferably having from 6 to 16 carbon atoms, particularly preferably having from 6 to 12 carbon atoms, for example, phenyloxy or 2-naphthyloxy), an acyl group (preferably having from 1 to 20 carbon atoms, more preferably having from 1 to 16 carbon atoms, particularly preferably having from 1 to 12 carbon atoms, for example, acetyl, benzoyl, formyl or pivaloyl), an alkoxycarbonyl group (preferably having from 2 to 20 carbon atoms, more preferably having from 2 to 16 carbon atoms, particularly preferably having 2 to 12 carbon atoms, for example, methoxycarbonyl or ethoxycarbonyl), an aryloxycarbonyl group (preferably having from 7 to 20 carbon atoms, more preferably having from 7 to 16 carbon atoms, particularly preferably having from 7 to 10 carbon atoms, for example, phenyloxycarbonyl), an acyloxy group (preferably having from 2 to 20 carbon atoms, more preferably having from 2 to 16 carbon atoms, and still more preferably having 2 to 10 carbon atoms, for example, acetoxy and benzoyloxy), an acylamino group (preferably having 2 to 20 carbon atoms, more preferably having 2 to 16 carbon atoms, particularly preferably having from 2 to 10 carbon atoms, for example, acetylamino or benzoylamino), an alkoxycarbonylamino group (preferably having from 2 to 20 carbon atoms, more preferably having from 2 to 16 carbon atoms, particularly preferably having from 2 to 12 carbon atoms, for example, methoxycarbonylamino), an aryloxycarbonylamino group (preferably having from 7 to 20 carbon atoms, more preferably having from 7 to 16 carbon atoms, particularly preferably having from 7 to 12 carbon atoms, for example, phenyloxycarbonylamino), an sulfonylamino group (preferably having from 1 to 20 carbon atoms, more preferably having from 1 to 16 carbon atoms, particularly preferably having from 1 to 12 carbon atoms, for example, methanesulfonylamino or benzenesulfonylamino), a sulfamoyl group (preferably having from 0 to carbon atoms, more preferably having from 0 to 16 carbon atoms, particularly preferably having from 0 to 12 carbon atoms, for example, sulfamoyl, methylsulfamoyl, dimethylsulfamoyl or phenylsulfamoyl), a carbamoyl group (preferably having from 1 to 20 carbon atoms, more preferably having from 1 to 16 carbon atoms, particularly preferably having from 1 to 12 carbon atoms, for example, carbamoyl, methylcarbamoyl, diethylcarbamoyl or phenylcarbamoyl), an alkylthio group (preferably having from 1 to 20 carbon atoms, more preferably having from 1 to 16 carbon atoms, particularly preferably having from 1 to 12 carbon atoms, for example, methylthio or ethylthio), an arylthio group (preferably having from 6 to 20 carbon atoms, more preferably having from 6 to 16 carbon atoms, particularly preferably having from 6 to 12 carbon atoms, for example, phenylthio), a sulfonyl group (preferably having from 1 to 20 carbon atoms, more preferably having from 1 to 16 carbon atoms, particularly preferably having from 1 to 12 carbon atoms, for example, mesyl or tosyl), a sulfinyl group (preferably having from 1 to 20 carbon atoms, more preferably having from 1 to 16 carbon atoms, particularly preferably having from 1 to 12 carbon atoms, for example, methanesulfinyl or benzenesulfinyl), a ureido group (preferably having from 1 to 20 carbon atoms, more preferably having from 1 to 16 carbon atoms, particularly preferably having from 1 to 12 carbon atoms, for example, ureido, methylureido or phenylureido), a phosphonamido group (preferably having from 1 to 20 carbon atoms, more preferably having from 1 to 16 carbon atoms, particularly preferably having from 1 to 12 carbon atoms, for example, diethylphosphonamido or phenylphosphonamido), a hydroxy group, a mercapto group, a halogen atom (for example, a fluorine atom, a chlorine atom, a bromine atom or an iodine atom), a cyano group, a sulfo group, a carboxyl group, a nitro group, a hydroxamic acid group, a sulfino group, a hydrazino group, an imino group, a heterocyclic group (preferably having from 1 to 20 carbon atoms, more preferably having from 1 to 12 carbon atoms, examples of the hetero atom including a nitrogen atom, an oxygen atom and a sulfur atom, and specific examples including pyrrolidine, piperidine, piperazine, morpholine, thiophene, furan, pyrrole, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylydine, quinoxaline, quinazoline, cinnoline, pteridine, acridine, phenanthroline, phenazine, tetrazole, benzimidazole, benzoxazole, benzthiazole, benzotriazole and tetraazaindene), and a silyl group (preferably having from 3 to 40 carbon atoms, more preferably having from 3 to 30 carbon atoms, particularly preferably having from 3 to 24 carbon atoms, for example, trimethylsilyl or triphenylsilyl).

The substituent represented by $R^{11}$ may further be substituted. When it has plural substituents, they may be the same or different and, if possible, may be combined with each other to form a ring. Examples of the ring to be formed include a cycloalkyl ring, a benzene ring, a thiophene ring, a dioxane ring and a dithiane ring.

The substituent represented by $R^{11}$ is preferably an alkyl group, an alkenyl group, an alkynyl group, an alkoxy group or an alkylthio group, and more preferably an alkyl group, an alkoxy group or an alkylthio group. Particularly preferably, when m11 is 2, two $R^{11}$ are alkoxy groups or alkylthio groups forming a ring to form a dioxane ring or a dithiane ring.

When m11 is 1 in formula (s1), $R^{11}$ is preferably an alkyl group, and more preferably an alkyl group having from 2 to 8 carbon atoms.

When formula (s1) is poly(3-alkylthiophene) in which $R^{11}$ is an alkyl group, the connecting mode between the adjacent thiophene rings includes a sterically regular mode in which all thiophene rings are connected by a 2-5' connection and a sterically irregular mode which contains a 2-2' connection and a 5-5' connection. Among them, the sterically irregular mode is preferred.

In the invention, it is particularly preferred, from the standpoint of achieving both the high transparency and the electrical conductivity, that the electron conductive polymer is poly (3,4-ethylenedioxy)thiophene (Compound (6) of specific examples shown below, PEDOT).

The polythiophene and derivatives thereof represented by formula (s1) may be produced by a known method described, for example, in *J. Mater. Chem.*, 15, 2077-2088 (2005) or *Advanced Materials*, 12 (7), 481 (2000). Also, commercial products, for example, DENATRON P502 (produced by Nagase ChemteX Corp), and 3,4-ethylenedioxythiophene (BAYTRON (registered trademark) M V2), 3,4-polyethylenedioxythiopene/polystyrenesulfonate (BAYTRON (registered trademark) P), BAYTRON (registered trademark) C), BAYTRON (registered trademark) F E, BAYTRON (registered trademark) M V2, BAYTRON (registered trademark) P, BAYTRON (registered trademark) P AG, BAYTRON (registered trademark) P HC V4, BAYTRON (registered trademark) P HS, BAYTRON (registered trademark) PH, BAYTRON (registered trademark) PH 500 and BAYTRON (registered trademark) PH 510 (produced by H. C. Starck GmbH) are available.

As polyaniline and its derivative, polyaniline (produced by Aldrich Chemical Company, Inc.) and polyaniline (emeraldine salt) (produced by Aldrich Chemical Company, Inc.) are available.

As polypyrrole and its derivative, polypyrrole (produced by Aldrich Chemical Company, Inc.) is available.

Specific examples of the electron conductive polymer are set forth below, but the invention should not be construed as being limited thereto. In the specific examples shown below, x and y each represents a number of repeating units. In addition to the compounds, compounds described in WO 98/01909 are also exemplified.

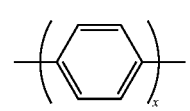
(1)

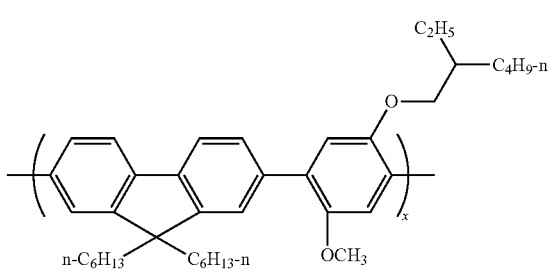
(2)

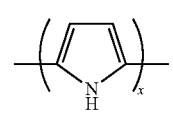
(3)

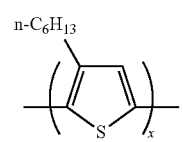
(4)

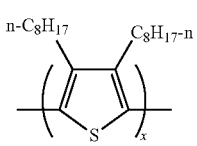
(5)

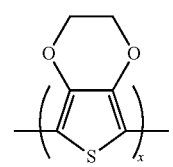
(6)

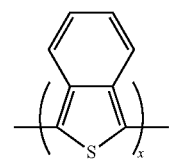
(7)

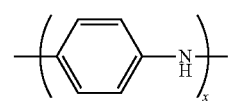
(8)

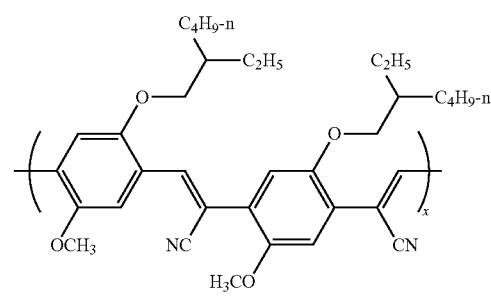
(9)

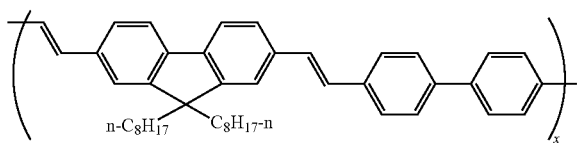

(10)

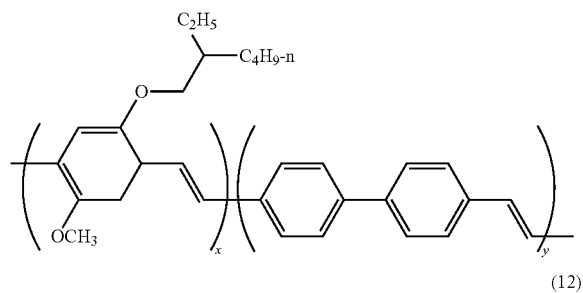

(11)

(12)

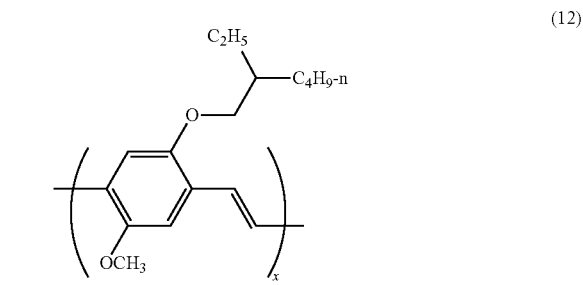

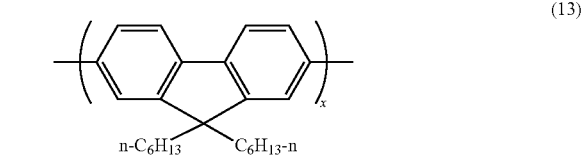

(13)

(14)

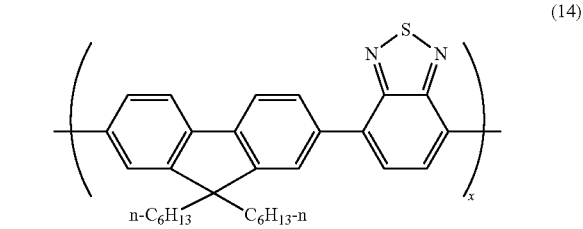

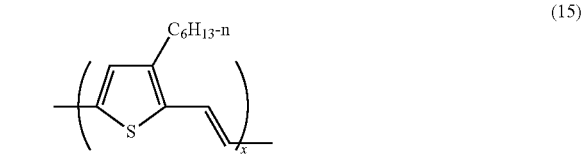

(15)

(16)

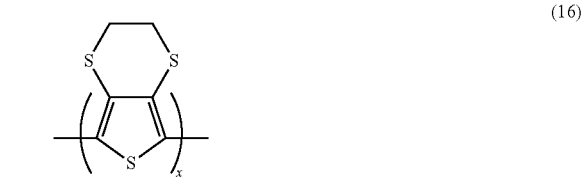

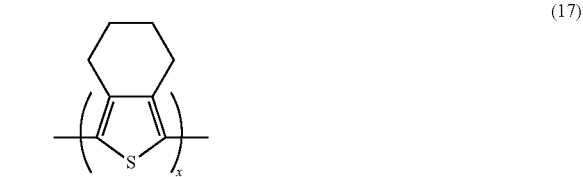

(17)

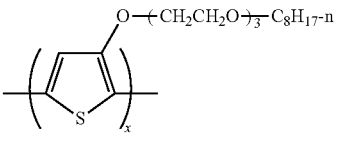

(18)

(Solubility in Organic Solvent)

It is preferred that the electron conductive polymer is soluble in an organic solvent from the standpoint of coating property and provision of affinity with (b) component.

More specifically, it is preferred that the electron conductive polymer is soluble at least 1.0% by weight in an organic solvent having a water content of 5% by weight or less and a dielectric constant from 2 to 30.

The term "soluble" as used herein indicates a state where the electron conductive polymer exists in the form of a single molecule or an association of plural single molecules in the organic solvent or a state where the electron conductive polymer is dispersed as a particle having a particle size of 300 nm or less in the organic solvent.

In general, the electron conductive polymer has a high hydrophilicity and is conventionally soluble in a solvent having water as the main component. In order to solubilize such an electron conductive polymer in an organic solvent, a method is exemplified wherein a compound (for example, solubilization aid described hereinafter) which increases affinity with the organic solvent or a dispersant in the organic solvent is added to a composition containing the electron conductive polymer. Also, in the case of using the electron conductive polymer together with a polyanion dopant, it is preferred to conduct a hydrophobizing treatment of the polyanion dopant as described below.

Further, a method is also employed wherein the electron conductive polymer is used in an undoped state (state not using a dopant) to increase the solubility in organic solvent and after the formation of a coating layer the dopant is added to generate conductivity.

In addition to the above, methods described in the references described below are also preferably used as the method of increasing the solubility in organic solvent.

For instance, in JP-A-2002-179911 a method is described wherein a polyaniline composition is dissolved in an organic solvent in an undoped state, the material is coated on a base material and dried, and then subjected to oxidation and doping treatment with a solution in which a protonic acid and an oxidizing agent are dissolved or dispersed to generate conductivity.

Also, in WO 05/035626 a method of producing a conductive polyaniline capable of being stably dispersed in an organic solvent is described wherein in oxidation polymerization of aniline or a derivative thereof in a mixed phase composed of an aqueous phase and an organic phase in the presence of at least one of a sulfonic acid and a water-insoluble organic polymer compound having a protonic acid group, a molecular weight modifier and, if desired, a phase-transfer catalyst are caused to coexist.

As the organic solvent, for example, an alcohol, an aromatic hydrocarbon, an ether, a ketone and an ester are suitable. Specific examples of the organic solvent are set forth below. The dielectric constant of each organic solvent is shown in parentheses.

The alcohol includes, for example, a monohydric alcohol and a dihydric alcohol. The monohydric alcohol is preferably a saturated aliphatic alcohol having from 2 to 8 carbon atoms.

Specific examples of the alcohol include ethyl alcohol (25.7), n-propyl alcohol (21.8), isopropyl alcohol (18.6), n-butyl alcohol (17.1), sec-butyl alcohol (15.5) and tert-butyl alcohol (11.4).

Specific examples of the aromatic hydrocarbon include benzene (2.3), toluene (2.2) and xylene (2.2). Specific examples of the ether include tetrahydrofuran (7.5), ethylene glycol monomethyl ether (16), ethylene glycol monomethyl ether acetate (8), ethylene glycol monoethyl ether (14), ethylene glycol monoethyl ether acetate (8) and ethylene glycol monobutyl ether (9). Specific examples of the ketone include acetone (21.5), diethyl ketone (17.0), methyl ethyl ketone (15.5), diacetone alcohol (18.2), methyl isobutyl ketone (13.1) and cyclohexanone (18.3). Specific examples of the ester include methyl acetate (7.0), ethyl acetate (6.0), propyl acetate (5.7) and butyl acetate (5.0).

The electron conductive polymer is preferably soluble at least 1.0% by weight in the organic solvent, more preferably soluble from 1.0 to 10.0% by weight in the organic solvent, and still more preferably soluble from 3.0 to 30.0% by weight in the organic solvent.

In the organic solvent, the electron conductive polymer may be present in the form of particle. In this case, an average particle size of the particle is preferably 300 nm or less, more preferably 200 nm or less, and still more preferably 100 nm or less. By controlling the average particle size to the range described above, precipitation of the particle in the organic solvent can be prevented. The lower limit of the particle size is not particularly restricted and is ordinarily 1 nm or more.

(Hydrophobizing Treatment)

In the case of using the polyanion dopant together with the electron conductive polymer as described above, it is preferred that the composition containing the electron conductive polymer and the polymer dopant is subjected to a hydrophobizing treatment. By performing the hydrophobizing treatment of the composition, solubility of the electron conductive polymer in an organic solvent can be increased to improve the affinity to the polyfunctional monomer having two or more polymerizable compound (B). The hydrophobizing treatment can be performed by modifying an anionic group of the polyanion dopant.

Specifically, a first method of the hydrophobizing treatment includes, for example, a method of esterification, etherification, acetylation, tosylation, tritylation, alkylsilylation or alkylcarbonylation of the anionic group. Among them, the esterification or etherification is preferred. The method of hydrophobization by the esterification includes a method wherein an anionic group of the polyanion dopant is chlorinated with a chlorinating agent and then esterified with an alcohol, for example, methanol or ethanol. Also, using a compound having a hydroxy group or a glycidyl group and an unsaturated double bond group, esterification is conducted with a sulfo group or a carboxyl group to hydrophobize.

In the invention, heretofore known various methods can be used and examples thereof are specifically described, for example, in JP-A-2005-314671 and JP-A-2006-28439.

A second method of the hydrophobizing treatment includes a method of connecting a basic compound to an anionic group of the polyanion dopant to conduct hydrophobization. The basic compound is preferably an amine compound and includes, for example, a primary amine, a secondary amine, a tertiary amine and an aromatic amine. Specific examples thereof include a primary, secondary or tertiary amine substituted with an alkyl group having from 1 to 20 carbon atoms, imidazole substituted with an alkyl group having from 1 to 20 carbon atoms and pyridine. For the purpose of increasing the solubility in organic solvent, a molecular weight of the amine compound is preferably from 50 to 2,000, more preferably from 70 to 1,000, and most preferably from 80 to 500.

An amount of the amine compound as the basic hydrophobizing agent is preferably from 0.1 to 10.0 molar equivalents, more preferably from 0.5 to 2.0 molar equivalents, particularly preferably from 0.85 to 1.25 molar equivalents, based on the anionic groups of the polyanion dopant which do not contribute to doping of the electron conductive polymer. In the range described above, the solubility in organic solvent, conductivity and strength of the coated layer can be fulfilled.

Further, with respect to details of the hydrophobizing treatment, descriptions, for example, in JP-A-2008-115215 and JP-A-2008-115216 can be referred to.

(Solubilization Aid)

The electron conductive polymer may be used together with a compound (hereinafter referred to as a solubilization aid) containing a hydrophilic moiety and a hydrophobic moiety and preferably, an ionizing radiation-curable functional group in its molecule.

By using the solubilization aid, the solubilization of the electron conductive polymer in an organic solvent having a low water content is assisted and further improvement in the surface state of the coated layer and increase in the strength of the cured layer are achieved in the layer formed from the composition according to the invention.

The solubilization aid is preferably a copolymer containing a hydrophilic moiety, a hydrophobic moiety and an ionizing radiation curable functional group-containing moiety, and particularly preferably a block type or graft type copolymer wherein these moieties are separately present as respective segments. Such a copolymer may be obtained by living anion polymerization, living radical polymerization or polymerization using a macromonomer having the moiety described above.

The solubilization aid is described, for example, in paragraphs [0022] to [0038] of JP-A-2006-176681.

(Method of Preparing Solution Containing Electron Conductive Polymer)

The electron conductive polymer is prepared in the form of a solution thereof using the organic solvent described above.

Although several methods are known for the preparation of a solution of the electron conductive polymer, three methods described below are preferred.

A first method is a method comprising polymerizing an electron conductive polymer in water in the presence of a polyanion dopant, then, if desired, treating by adding the solubilization aid or basic hydrophobizing agent described above, and thereafter replacing the water with the organic solvent. A second method is a method comprising polymerizing an electron conductive polymer in water in the presence of a polyanion dopant, then, if desired, treating by adding the solubilization aid or basic hydrophobizing agent described above, evaporating the water to dryness, and thereafter adding the organic solvent to solubilize. A third method is a method comprising preparing separately a π-conjugated system conductive polymer and a polyanion dopant, mixing and dispersing the both in a solvent to prepare a dope of a conductive polymer composition, and replacing water with the organic solvent when the solvent contains the water.

In the methods described above, an amount of the solubilization aid used is preferably from 1 to 100% by weight, more preferably from 2 to 70% by weight, most preferably from 5 to 50% by weight, based on the total amount of the electron conductive polymer and polyanion dopant. In the first method, the method of replacing water with the organic solvent is preferably a method of adding a highly water-miscible solvent, for example, ethanol, isopropyl alcohol or acetone to prepare a uniform solution and removing the water by ultrafiltration. Also, a method of lowering the water content to some extent by adding a highly water-miscible solvent, mixing a more hydrophobic solvent and removing the highly volatile component under a reduced pressure to prepare a solvent composition is exemplified. Further, it is also possible that when the hydrophobization is sufficiently conducted using the basic hydrophobizing agent, an organic solvent of low miscibility with water is added to form a separated two phases system and the organic conductive polymer in the aqueous phase is extracted to the organic solvent phase.

From the standpoint of improvement in antistatic property and inhibition of occurrence of unevenness due to bleeding out, a weight average molecular weight of the ion conductive compound is preferably from 2,000 to 500,000, and more preferably from 5,000 to 300,000. A weight average molecular weight of the electron conductive compound is preferably from 20,000 to 500,000, more preferably from 20,000 to 300,000, and still more preferably from 20,000 to 100,000. The weight average molecular weight is a weight average molecular weight measured by gel permeation chromatography and calculated in terms of polystyrene.

The content of the conductive polymer in a coating composition for forming antistatic hardcoat layer according to the invention is preferably from 1 to 12% by weight, more preferably from 1 to 10% by weight, and still more preferably from 1.5 to 8% by weight, based on the total weight of the curable compound having a (meth)acryloyl group in the coating composition from the standpoint of imparting high hardness and high antistatic property. When the content is 1% by weight or more, the antistatic performance can be generated. When the content is 12% by weight or less, the antistatic performance and film strength (pencil hardness) can be improved and it is also preferred in view of cost.

<Curable Compound Having (Meth)Acryloyl Group in its Molecule>

The antistatic hardcoat layer according to the invention is formed from a coating composition containing a curable compound having a (meth)acryloyl group in its molecule in addition to the organic antistatic agent described above.

The curable compound having a (meth)acryloyl group in its molecule can function as a binder and from the standpoint of strength or scratch resistance of the coated layer, it is preferably a polyfunctional monomer having two or more (meth)acryloyl groups in its molecule, and more preferably a polyfunctional monomer having three or more (meth)acryloyl groups in its molecule.

Also, the curable compound having a (meth)acryloyl group in its molecule is preferably an ionizing radiation-curable compound.

The curable compound having a (meth)acryloyl group in its molecule is preferably an ester of a polyhydric alcohol with (meth)acrylic acid. Examples thereof include 1,4-butanediol di(meth)acrylate, 1,6-hexanediol di(meth)acrylate, neopentyl glycol (meth)acrylate, ethylene glycol di(meth)acrylate, triethylene glycol di(meth)acrylate, pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate and caprolactone-modified tris(acryloxyethyl)isocyanurate.

As to the polyfunctional acrylate compound having a (meth)acryloyl group, commercial products may also be used and examples thereof include A-TMMT and A-DPH produced by Shin-Nakamura Chemical Co., Ltd.

A fluorine-free polyfunctional monomer is described in paragraphs [0114] to [0122] of JP-A-2009-98658, and the same can be applied to the invention.

In the coating composition for forming antistatic hardcoat layer according to the invention, from the standpoint of good hardness and high antistatic performance, the curable compound having a (meth)acryloyl group is preferably that having a small content of polar group, specifically, that having a small content of a hydroxy group, a carboxyl group and a urethane group. The total content of the curable compound having a (meth)acryloyl group which further has at least one group selected from a hydroxy group, a carboxyl group and a urethane group is preferably 40% by weight or less, more preferably 30% by weight or less, still more preferably 25% by weight or less, based on the total weight of the compound having a (meth)acryloyl group.

The content of the compound having a (meth)acryloyl group in its molecule in the coating composition for forming antistatic hardcoat layer according to the invention is preferably from 50 to 95% by weight, more preferably from 70 to 95% by weight, still more preferably from 80 to 95% by weight, based on the total solid content of the coating composition, from the standpoint of achieving high hardness of the coated layer.

<Photopolymerization Initiator>

The coating composition for forming antistatic hardcoat layer may contain a photopolymerization initiator.

Examples of the photopolymerization initiator include an acetophenone, a benzoin, a benzophenone, phosphine oxide, a ketal, an anthraquinone, a thioxanthone, an azo compound, a peroxide, a 2,3-dialkyldione compound, a disulfide compound, a fluoroamine compound, an aromatic sulfonium, a lophine dimer, an onium salt, a borate, an active ester, an active halogen, an inorganic complex and a coumarin. Specific examples, preferred embodiments and commercial products of the photopolymerization initiator are described in paragraphs [0133] to [0151] of JP-A-2009-98658, and these can be also suitably used in the invention.

Various examples are also described in *Saishin UV Koka Gijutsu* (*Latest UV Curing Technologies*), p. 159, Technical Information Institute Co., Ltd. (1991) and Kiyomi Kato, *Shigaisen Koka System* (*Ultraviolet Curing System*), pp. 65-148, Sogo Gijutsu Center (1989), and these are useful in the invention.

The content of the photopolymerization initiator in the coating composition for forming antistatic hardcoat layer according to the invention is preferably from 0.5 to 8% by weight, more preferably from 1 to 5% by weight, based on the total solid content of the coating composition.

The antistatic hardcoat layer according to the invention is particularly preferably that formed from a coating composition containing at least an organic antistatic agent, a curable compound having three or more (meth)acryloyl groups in its molecule, a initiator and a solvent.

(Other Functional Layers)

The optical film according to the invention may have a functional layer other than the antistatic hardcoat layer. The functional layer is not particularly restricted as long as it is not against the spirit of the invention. For example, the optical films of the embodiment shown below are exemplified.

Base material film/antistatic hardcoat layer
Base material film/hardcoat layer/antistatic hardcoat layer
Base material film/antistatic hardcoat layer/low refractive index layer
Base material film/antistatic hardcoat layer/antiglare layer
Base material film/antiglare layer/antistatic hardcoat layer
Base material film/antistatic hardcoat layer/high refractive index layer/low refractive index layer
Base material film/antistatic hardcoat layer/medium refractive index layer/high refractive index layer/low refractive index layer
Base material film/antistatic hardcoat layer/antiglare layer/low refractive index layer

[Physical Properties of Antistatic Hardcoat Layer]

The refractive index of the antistatic hardcoat layer according to the invention is preferably from 1.48 to 1.65, more preferably from 1.48 to 1.60, and most preferably from 1.48 to 1.55. The refractive index in the range described above is preferred, because interference unevenness with the base material can be suppressed and when a low refractive index layer is stacked, the reflection hue can be made neutral.

The film thickness of the antistatic hardcoat layer is preferably 1 μm or more, more preferably from 4 to 20 μm, still more preferably from 6 to 18 μm, and most preferably from 6 to 15 μm. In the range described above, both the physical strength and the conductivity can be satisfied.

Also, as to the strength of the antistatic hardcoat layer, the higher the more preferred. For practical purpose, the strength in the pencil hardness test is preferably 3H or more, and more preferably 4H or more. Further, it is preferred that in the Taber test according to JIS K 5400, an abrasion loss of a sample before and after the test is as small as possible.

The transmittance of the antistatic hardcoat layer is preferably 80% or more, more preferably 85% or more, and most preferably 90% or more.

[Physical Properties of Optical Film]

The common logarithmic value (Log SR) of the surface resistivity SR (Ω/sq) of the optical film according the invention is preferably lower in view of antistatic property and, in an environment at 25° C. and 60%, preferably 10.0 or less, more preferably 9.3 or less. By setting the surface resistivity to the range described above, the reduction in visibility due to attachment of dust or the like on the display screen is prevented and the destruction preventing property of display device due to static electricity can be imparted.

In the optical film according to the invention it is preferred that the total haze value is from 0.1 to less than 1% and the arithmetic average roughness Ra based on JIS B 0601 is 0.03 μm or less. When the values are in the ranges described above respectively, it is preferred because the transmittancy and smoothness are excellent and the visibility becomes good.

The total haze value is more preferably from 0.1 to less than 0.5%. The Ra is more preferably from 0.001 to 0.015 μm.

(Method of Producing Optical Film)

The optical film according to the invention can be formed by the method described below, but the invention should not be construed as being limited thereto.

First, a composition for forming antistatic hardcoat layer is prepared. Next, the composition is coated on a transparent support, for example, by a dip coating method, an air knife coating method, a curtain coating method, a roller coating method, a wire bar coating method, a gravure coating method or a die coating method, and then heated and dried. A microgravure coating method, a wire bar coating method and a die coating method (see, U.S. Pat. No. 2,681,294 and JP-A-2006-122889) are more preferred, and a die coating method is particularly preferred.

After the coating and drying, the layer formed from the composition for forming antistatic hardcoat layer is cured by irradiation with light, whereby an antistatic hardcoat layer is formed. If desired, other layers (layers constituting the optical film, for example, a hard coat layer or an antiglare layer) may be previously coated on the base material, and the antistatic hardcoat layer may be formed thereon. Alternatively, the antistatic hardcoat layer according to the invention may be provided on the base material and then other layers may be formed thereon. Thus, the optical film according to the invention is obtained.

The method of producing optical film according to the invention is preferably a method comprising a step of coating and curing the composition for forming antistatic hardcoat layer on a transparent base material to form an antistatic hardcoat layer.

The antistatic hardcoat layer may contain a matte particle, for example, an inorganic compound particle or a resin particle for the purpose of imparting an internal scattering property.

For the purpose of controlling the refractive index of the antistatic hardcoat layer, monomers or inorganic particles having various refractive indexes or both of them can be added to the binder of the antistatic hardcoat layer. The inorganic particle has an effect of suppressing curing shrinkage due to a crosslinking reaction, in addition to the effect of controlling the refractive index. The binder as referred to in the invention is a binder inclusive of a polymer produced by polymerization, for example, of the polyfunctional monomer and/or high refractive index monomer after the formation of the antistatic hardcoat layer and inorganic particles dispersed therein. As the inorganic particle for controlling the refractive index, a silica fine particle is exemplified.

(Antiglare Layer)

In the invention, separately from the antistatic hardcoat layer, an antiglare layer may be formed for the purpose of imparting to the film, an antiglare property due to surface scattering and preferably a hardcoat property for increasing hardness and scratch resistance of the film.

The antiglare layer is described in paragraphs [0178] to [0189] of JP-A-2009-98658, and the same can be applied to the invention.

In the case where the optical film according to the invention has, for example, a configuration where two layers of antiglare layer/antistatic hardcoat layer are stacked on a transparent support, a method may be employed in which the two layers described above are formed by simultaneously coating and forming two coated layers in one coating step.

On that occasion, by simultaneously coating and forming two layers of the antistatic hard coat layer and the antiglare layer in one coating step, it becomes possible to achieve high productivity with a low cost. As a method for simultaneously forming two layers in one coating step, a known method can be employed. Specifically, a method described, for example, in paragraphs [0032] to [0056] of JP-A-2007-293302 can be utilized.

(High Refractive Index Layer and Medium Refractive Index Layer)

The optical film according to the invention may comprise a high refractive index layer or a medium refractive index layer.

A refractive index of the high refractive index layer is preferably from 1.65 to 2.20, and more preferably from 1.70 to 1.80. A refractive index of the medium refractive index layer is adjusted to a value between a refractive index of the low refractive index layer and a refractive index of the high refractive index layer. The refractive index of the medium refractive index layer is preferably from 1.55 to 1.65, and more preferably from 1.58 to 1.63.

As to a method of forming the high refractive index layer or the medium refractive index layer, although a transparent thin film of an inorganic oxide formed by a chemical vapor deposition (CVD) method or a physical vapor deposition (PVD) method, particularly a vacuum vapor deposition method or a sputtering method, each of which is a kind of the physical vapor deposition method, can be employed, a method by all-wet coating is preferred.

The medium refractive index layer and high refractive index layer are not particularly restricted as long as they are layers having a refractive index falling within the range described above respectively, and those known as the constituting components thereof can be employed. Specific examples thereof are described in paragraphs [0074] to [0094] of JP-A-2008-262187.

(Low Refractive Index Layer)

It is preferred that the optical film according to the invention has a low refractive index layer on the antistatic hardcoat layer directly or through other layer. In that case, the optical film according to the invention can function as an antireflective film.

In that case, the low refractive index layer has a refractive index lower than that of the antistatic hardcoat layer and the refractive index of the low refractive index layer is preferably from 1.30 to 1.51, more preferably from 1.30 to 1.46, and still more preferably from 1.32 to 1.38. It is preferred to set the refractive index of the low refractive index layer in the range described above because the reflectance can be kept low and the film strength can be maintained. As to a method of forming the low refractive index layer, although a transparent thin film of an inorganic oxide formed by a chemical vapor deposition (CVD) method or a physical vapor deposition (PVD) method, particularly a vacuum vapor deposition method or a sputtering method, each of which is a kind of the physical vapor deposition method, can be employed, a method by all-wet coating using a composition for low refractive index layer is preferred.

The low refractive index layer is not particularly restricted a long as it is a layer having a refractive index falling within the range described above, and those known as the constituting component thereof can be employed. Specifically, a composition containing a fluorine-containing curable resin and an inorganic fine particle described in JP-A-2007-298974 and a hollow silica fine particle-containing low refractive index coating described in JP-A-2002-317152, JP-A-2003-202406 and JP-A-2003-292831 can be suitably used.

[Protective Film for Polarizing Plate]

In the case of using the optical film according to the invention as a surface protective film of a polarizing film (protective film for polarizing plate), adhesiveness to the polarizing film mainly composed of polyvinyl alcohol can be improved by hydrophilizing, specifically, conducting a so-called saponification treatment, a surface of the transparent support on an opposite side to having a thin film layer, namely, a surface on the side to be stuck with the polarizing film.

It is also preferred that of two protective films of a polarizer, the film other than the optical film is an optical compensation film having an optical compensation layer containing an optically anisotropic layer. The optical compensation film (retardation film) can improve a viewing angle characteristic on a liquid crystal display screen.

Although a known optical compensation film can be used as the optical compensation film, from the standpoint of enlarging the viewing angle, an optical compensation film described in JP-A-2001-100042 is preferred.

The saponification treatment is described below. The saponification treatment is a treatment comprising immersing an optical film in a warmed aqueous alkali solution for a certain period of time, washed with water, and washed with an acid for neutralization. The saponification treatment may be performed under any treatment conditions as long as the surface of the transparent base material on the side to be stacked with the polarizing film is hydrophilized. Therefore the concentration of a treatment agent, the temperature of a treatment agent solution and the treatment time are appropriate determined. Ordinarily, from the necessity of ensuring productivity, the treatment conditions are determined so as to complete the treatment within 3 minutes. As to the ordinary conditions, the alkali concentration is from 3 to 25% by weight, the treatment temperature is from 30 to 70° C., and the treatment time is from 15 seconds to 5 minutes. The alkali species for use in the alkali treatment is preferably sodium hydroxide or potassium hydroxide, the acid for use in the acid washing is preferably sulfuric acid, and the water for use in the water washing is preferably ion exchanged water or pure water.

The antistatic hardcoat layer of the optical film according to the invention can well maintain the antistatic property even when it is exposed to the aqueous alkali solution in the saponification treatment as described above.

In the case of using the optical film according to the invention as a surface protective film of a polarizing film (protective film for polarizing plate), the cellulose acylate film is preferably a cellulose acetate film.

[Polarizing Plate]

The polarizing plate according to the invention is a polarizing plate having a polarizing film and two protective films for protecting both surfaces of the polarizing film, wherein at least one of the surface protective films is the optical film or antireflective film according to the invention.

Examples of the polarizing film include an iodine-type polarizing film, a dye-type polarizing film using a dichromatic dye and a polyene-type polarizing film. The iodine-type polarizing film and dye-type polarizing film can ordinarily produced by using a film of polyvinyl alcohol type.

A construction is preferred in which the cellulose acylate film of the optical film is adhered to the polarizing film, if desired, through, for example, an adhesive layer composed of polyvinyl alcohol, and on the other side of the polarizing film, a protective film is provided. The protective film may have an adhesive layer on the side opposite to the side on which the polarizing film is placed.

By using the optical film according to the invention as a protective film for polarizing plate, the polarizing plate excellent in the physical strength, antistatic property and durability can be produced.

In addition, the polarizing plate according to the invention can also have an optical compensation function. In that case, it is preferred that, of two surface protective films, only either the surface protective film on the front side or the surface protective film on the rear side is formed with the optical film described above and the surface protective film on the side opposite to the side on which the polarizing plate has the optical film is an optical compensation film.

By producing the polarizing plate using the optical film according to the invention as one of the protective films for polarizing plate and an optical compensation film having optical anisotropy as the other of the protective films for polarizing plate, the contrast and up/down left/right viewing angle of liquid crystal display device in a bright room can be further improved.

[Image Display Device]

Figure 2:
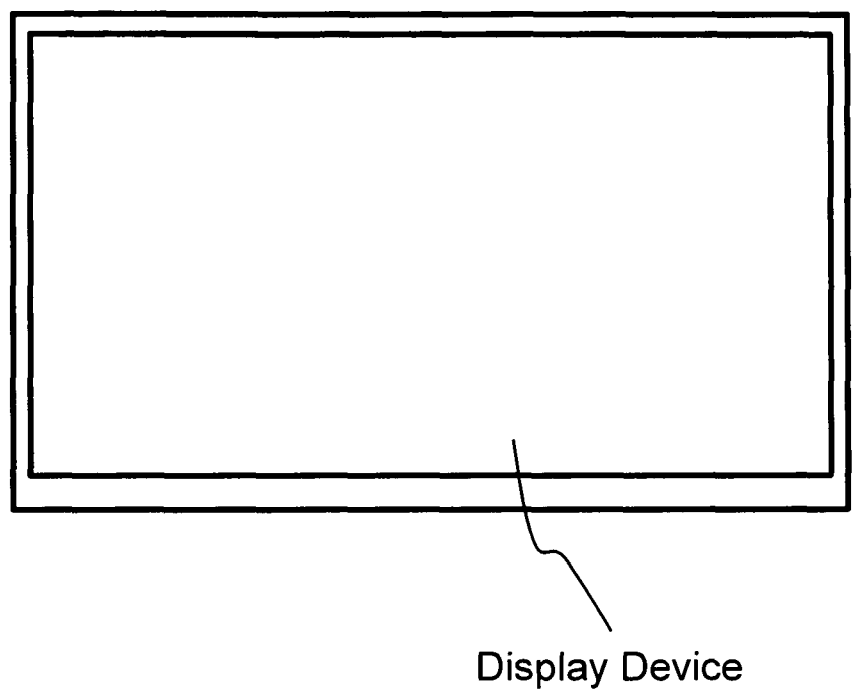
FIG. 2 is a view of an image display device of the present invention.

As seen in FIG. 2, the image display device according to the invention has the optical film or polarizing plate according to the invention on the uppermost surface of its display.

The optical film or polarizing plate according to the invention can be preferably used in an image display device, for example, a liquid crystal display device (LCD), a plasma display panel (PDP), an electroluminescence display (ELD) or a cathode ray tube display (CRT).

In particular, it can be advantageously used in an image display device, for example, a liquid crystal display device, and it is particularly preferred to use the optical film as the uppermost layer on the backlight side of a liquid crystal cell in a transmission/semi-transmission liquid crystal display device.

The liquid crystal display device ordinarily has a liquid crystal cell and two polarizing plates disposed on both sides of the liquid crystal cell, and the liquid crystal cell bears a liquid crystal between two electrode base materials. Further, one optically anisotropic layer is disposed between the liquid crystal cell and one of the polarizing plates, or two optically anisotropic layers may be disposed between the liquid crystal cell and both of the polarizing plates, respectively.

The liquid crystal cell is preferably in a TN mode, a VA mode, an OCB mode, an IPS mode or an ECB mode.

EXAMPLES

The features of the invention will be described in more detail with reference to the examples and comparative examples below. The materials, amounts of use, proportions, contents of treatments, treating procedures and the like can be appropriately altered as long as the gist of the invention is not exceeded. Therefore, the scope of the invention should not be construed as being limited to the specific examples described below.

Example A

Production of Base Material Film (1) Preparation of Plural Sugar Ester Compounds Having Different Ester Substitution Degrees The plural sugar ester compounds having different ester substitution degrees described in Table 6 shown below were prepared according to the method shown below.

First, Compounds 112 to 117 shown in Table 1 above were synthesized according to the method described in Synthesis of Exemplary Compound 3 in paragraph [0054] of WO 2009/031464.

Also, other compounds (for example, sucrose acetylate) were synthesized in a similar manner. Then, the compounds were mixed to prepare the sugar ester compounds. As to the sugar ester compounds synthesized, reduced-pressure drying (at 10 mmHg or less) of toluene, which had been the reaction solvent, was conducted, and the compounds having the remaining solvent of less than 100 ppm were used.

(Method of Measuring Average Substitution Degree of Sugar Ester Compound)

A space ratio at every retention time was measured under HPLC conditions shown below and a substitution degree relative to the total area was calculated.

<HPLC Measuring Conditions>
Column: TSK-gel ODS-100Z (produced by Tosoh Corp.), 4.6×150 mm, Lot No. (P0014)
Eluent A: $H_2O$=100, Eluent B: AR=100, both Eluent A and Eluent B containing 0.1% of AcOH and 0.1% of $NEt_3$
Flow rate: 1 ml/min, Column temperature: 40° C., Wavelength: 254 nm, Sensitivity: AUX2, Injection amount: 10 μl, Rinse solution: $THF/H_2O$=9/1 (in volume ratio)
Sample concentration: 5 mg/10 ml (THF)

(2) Preparation of Dope

The composition shown below was charged in a mixing tank, stirred to dissolve respective components, heated at 90° C. for about 10 minutes, and then filtered through a filter paper having an average pore size of 34 μm and a sintered metallic filter having an average pore size of 10 μm.

Cellulose Acylate Solution 1

| Cellulose acetate having acetyl substitution degree of 2.85 and molecular weight of 300,000 | 100.0 parts by weight |
| Plural sugar ester compounds having different ester substitution degrees shown in Comparative Example 1 in Table 6 below | 8.0 parts by weight in total |
| Methylene chloride | 365.8 parts by weight |
| Methanol | 92.6 parts by weight |
| Butanol | 4.6 parts by weight |

Matting Agent Dispersion

The composition shown below containing the cellulose acylate solution prepared by the method described above was charged in a disperser to prepare a matting agent dispersion.

Matting Agent Dispersion

| Matting agent (silica particle having average particle size of 16 nm (AEROSIL R972, produced by Nippon Aerosil Co., Ltd.) | 0.2 parts by weight |
| Methylene chloride | 65.7 parts by weight |
| Methanol | 16.6 parts by weight |
| Butanol | 0.8 parts by weight |
| Cellulose acylate solution 1 | 10.3 parts by weight |

Into 100 parts by weight of Cellulose acylate solution 1 described above was mixed the matting agent dispersion so as to have 0.02 parts by weight of the inorganic fine particle relate to the cellulose acylate resin to prepare a dope for film-formation.

(3) Casting

Each of the dopes was heated at 30° C. and cast using a drum film-forming machine. The drum was made of SUS and surface temperature of the drum was set at −5° C., and special temperature of the whole casting unit was set at 15° C.

(4) Drying

The web (film) formed by the casting was peeled from the drum and air-dried at 40° C. using a tenter in which the web was conveyed while being clipped at the both ends by clips.

(5) Stretching

When the residual solvent amount in the web (film) clipped in the tenter became from 30 to 5% relative to the weight of the whole film, the web (film) was stretched by 10% in the direction perpendicular to the film conveying direction (lateral direction) by the tenter.

Subsequently, the cellulose acylate film was unclipped and dried at 110° C. for 30 minutes. In that step, the casting film thickness was controlled so as to have the film thickness after stretching of 40 μm.

Thus, Cellulose acetate film base material 1 used in Comparative Example 1 was prepared.

Each of cellulose acetate film base materials for the examples and comparative examples was obtained by preparing the dope for film-formation and conducting the casting, drying and stretching in the same manner as in Cellulose acetate film base material 1 used in Comparative Example 1 except that the ester substitution degree and ratio of sugar ester compounds and the kind of plasticizer were changed as shown in Table 6. The sugar ester compounds used in the film base materials were mixtures of the sugar ester compounds having the ester substitution degrees shown in Table 6 in a molar ratio (% by mole) shown in Table 6, respectively.

As to a film base material used in Comparative Example 4, a dope for film-formation using a mixture of triphenyl phosphate (TPP) and biphenyl diphenyl phosphate (BDP) in a ratio of 3:1 was prepared and the film base material was produced in the same manner as above.

[Production of Optical Film]

A coating solution for forming antistatic hardcoat layer was prepared and an antistatic hardcoat layer was formed on the film base material to produce an optical film.

(Preparation of Coating Solution for Forming Antistatic Hardcoat Layer)

The components shown in Table 7 were charged in a mixing tank, stirred and filtered through a filter made of propylene having a pore size of 0.4 μm to prepare Coating solutions HC-1 to HC-14 for forming antistatic hardcoat layer, respectively. The unit of the amount of each component added shown in Table 7 is a part by weight.

The respective compounds used are described below.

A-TMM-3LM-N: Mixture of pentaerythritol tetraacrylate and pentaerythritol triacrylate (triacrylate ratio: 57%), produced by Shin-Nakamura Chemical Co., Ltd.
A-TMMT: Pentaerythritol tetraacrylate, produced by Shin-Nakamura Chemical Co., Ltd.
VISCOTE 295: Trimethylolpropane triacrylate, produced by Osaka Organic Chemical Industry Ltd.
EBECRYL 5129 (EB-5129): Hexafunctional aliphatic urethane acrylate, produced by Daicel Corp.
BLEMMER GMR: Glycerol dimethacrylate, produced by NOF Corp.
SAS-PE: Conductive polymer containing polythiophene polystyrenesulfonate, produced by Shin-Etsu Polymer Co., Ltd.
1-Hydroxycyclohexy phenyl ketone: Polymerization initiator, IRGACURE 184, produced by Ciba Specialty Chemicals Inc.

(Production of Antistatic Hardcoat Layer)

On a cellulose acetate film base material obtained according to the method described above was coated the coating solution for antistatic hardcoat layer described above using a gravure coater and dried at 60° C. for about 2 minutes. Then, the coated layer was cured by irradiating an ultraviolet ray at an illuminance of 400 mW/cm$^2$ and an irradiation dose of 120 mJ/cm$^2$ using an air-cooled metal halide lamp (produced by Eye Graphics Co., Ltd.) of 160 W/cm while purging with nitrogen so as to give an atmosphere having an oxygen concentration of 1.0% by volume or less, whereby an optical film sample was formed.

[Antistatic Property (1)]

The optical film sample was left standing under the conditions of 25° C. and 60% RH for 2 hours and then the surface resistance thereof was measured using a superinsulation resistance/microammeter, TR8601 (produced by Advantest Corp.). A smaller common logarithm of the surface resistance value (log SR) indicates a better antistatic property. The log SR obtained was evaluated according to the criteria shown below. The results obtained are shown in Table 6.

A: log SR≤9.3
B: 9.3<log SR≤10.0
C: 10.0<log SR<10.7
D: log SR≥10.7

[Pencil Hardness]

The optical film sample was subjected to humidity conditioning under the conditions of 23° C. and 50% RH for 2 hours and then scratched five times using a test pencil defined in JIS S 6006 under a load of 750 g according to the pencil hardness evaluation method defined in JIS K 5600. A set of the scratching test was repeated five times. The visual evaluation was performed after every set of the scratching test, and hardness of the pencil which were recognized to make no defect in three sets or more of the five sets was calculated in increments of 0.5 H as an average of the five sets to be designated as the pencil hardness of the optical film sample. The defect defined in JIS K 5600 includes break of the coating and scratch of the coating and does not intend dent on the coating, but the dent on the coating was also included in the defect to evaluate the pencil hardness. The results obtained are shown in Table 6.

[Antistatic Property after Exposed to High Temperature and High Humidity Environment (Antistatic Property (2)]

The optical film sample was stored under the conditions of 80° C. and 90% RH for 500 hours and then dried once until no water remained. Thereafter, the optical film sample was left standing under the conditions of 25° C. and 60% RH for 2 hours and subjected to the evaluation in the same manner as in Antistatic property (1) described above. The difference (Δ log SR) between the value thus-obtained and the value obtained in Antistatic property (1) was calculated. A smaller Δ log SR indicates a better antistatic property after exposed to high temperature and high humidity environment. The Δ log SR obtained was evaluated according to the criteria shown below. The results obtained are shown in Table 6.

A: Δ log SR<0.3
B: 0.3≤Δ log SR<1.0
C: 1.0≤Δ log SR<2.0
D: Δ log SR≥2.0

TABLE 6

| | | | Kind of Plasticizer and Ester Substitution Degree | | | | | | |
|---|---|---|---|---|---|---|---|---|---|
| Sample No. | Remarks | Kind of Plasticizer | Sucrose Acetylate Substitution Degree 100% | Sucrose Benzoate Substitution Degree 100% | Sucrose Benzoate Substitution Degree 87.5% | Sucrose Benzoate Substitution Degree 75% | Sucrose Benzoate Substitution Degree 67.5% | Sucrose Benzoate Substitution Degree 50% | Sucrose Benzoate Substitution Degree 37.5% |
| No. 1 | Comparative Example 1 | Sucrose Benzoate | — | 80 | — | 20 | — | — | — |
| No. 2 | Example 1 | Sucrose Benzoate | — | 80 | — | — | 20 | — | — |
| No. 3 | Example 2 | Sucrose Benzoate | — | 80 | — | — | 10 | 10 | — |

TABLE 6-continued

| | | | | | | | | |
|---|---|---|---|---|---|---|---|---|
| No. 4 | Example 3 | Sucrose Benzoate | — | 50 | 30 | — | 10 | 10 | — |
| No. 5 | Example 4 | Sucrose Benzoate | — | 40 | 30 | — | 10 | 20 | — |
| No. 6 | Example 5 | Sucrose Benzoate | — | 20 | 50 | 20 | — | 4 | 6 |
| No. 7 | Example 6 | Sucrose Benzoate | — | 20 | 40 | 10 | 10 | 10 | 10 |
| No. 8 | Example 7 | Sucrose Benzoate | — | 5 | 22 | 32 | 26 | 13 | 2 |
| No. 9 | Example 8 | Sucrose Benzoate | — | 5 | 22 | 32 | 26 | 13 | 2 |
| No. 10 | Example 9 | Sucrose Benzoate | — | 5 | 22 | 32 | 26 | 13 | 2 |
| No. 11 | Example 10 | Sucrose Benzoate | — | 5 | 22 | 32 | 26 | 13 | 2 |
| No. 12 | Example 11 | Sucrose Benzoate | — | 5 | 22 | 32 | 26 | 13 | 2 |
| No. 13 | Example 12 | Sucrose Benzoate | — | 5 | 22 | 32 | 26 | 13 | 2 |
| No. 14 | Example 13 | Sucrose Benzoate | — | 5 | 22 | 32 | 26 | 13 | 2 |
| No. 15 | Example 14 | Sucrose Benzoate | — | 5 | 22 | 32 | 26 | 13 | 2 |
| No. 16 | Example 15 | Sucrose Benzoate | — | 5 | 22 | 32 | 26 | 13 | 2 |
| No. 17 | Example 16 | Sucrose Benzoate- | — | 5 | 22 | 32 | 26 | 13 | 2 |
| No. 18 | Example 17 | Sucrose Benzoate | — | 5 | 22 | 32 | 26 | 13 | 2 |
| No. 19 | Example 18 | Sucrose Benzoate | — | 5 | 22 | 32 | 26 | 13 | 2 |
| No. 20 | Example 19 | Sucrose Benzoate | — | 5 | 22 | 32 | 26 | 13 | 2 |
| No. 21 | Example 20 | Sucrose Benzoate | — | 5 | 15 | 15 | 40 | 23 | 2 |
| No. 22 | Example 21 | Sucrose Benzoate | — | — | — | 5 | 65 | 25 | 5 |
| No. 23 | Comparative Example 2 | Sucrose Benzoate | — | — | — | 5 | 49 | 44 | 2 |
| No. 24 | Comparative Example 3 | Sucrose Benzoate | — | — | — | 5 | 28 | 65 | 2 |
| No. 25 | Comparative Example 4 | TPP/BOP | — | — | — | — | — | — | — |
| No. 26 | Example 22 | Mixture of Sucrose Benzoate and Sucrose Acetate | 80 | — | — | — | 10 | 10 | — |
| No. 27 | Example 23 | Sucrose Benzoate | — | 80 | — | — | 10 | 10 | — |

| | | | | Performances of Stack | | |
|---|---|---|---|---|---|---|
| Sample No. | Average Ester Substitution Degree (%) | X (see below) | Antistatic Hardcoat Layer | Antistatic Property (1) of Fresh Sample | Pencil Hardness | Y (see below) |
| No. 1 | 95.0 | 100.0 | HC-1 | B | 2.5 H | D |
| No. 2 | 93.5 | 80.0 | HC-1 | B | 3.0 H | B |
| No. 3 | 91.8 | 80.0 | HC-1 | B | 3.0 H | B |
| No. 4 | 88.0 | 80.0 | HC-1 | B | 3.0 H | B |
| No. 5 | 83.0 | 70.0 | HC-1 | B | 3.5 H | B |
| No. 6 | 83.0 | 90.0 | HC-1 | B | 3.0 H | B |
| No. 7 | 78.0 | 70.0 | HC-1 | B | 3.5 H | B |
| No. 8 | 73.1 | 59.0 | HC-1 | B | 3.5 H | B |
| No. 9 | 73.1 | 59.0 | HC-2 | A | 3.5 H | B |
| No. 10 | 73.1 | 59.0 | HC-3 | A | 4.0 H | B |
| No. 11 | 73.1 | 59.0 | HC-4 | A | 4.0 H | A |
| No. 12 | 73.1 | 59.0 | HC-5 | A | 4.0 H | B |
| No. 13 | 73.1 | 59.0 | HC-6 | A | 4.0 H | A |
| No. 14 | 73.1 | 59.0 | HC-7 | B | 3.0 H | B |
| No. 15 | 73.1 | 59.0 | HC-8 | A | 3.0 H | B |
| No. 16 | 73.1 | 59.0 | HC-9 | A | 3.0 H | A |
| No. 17 | 73.1 | 59.0 | HC-10 | A | 2.5 H | A |
| No. 18 | 73.1 | 59.0 | HC-11 | B | 3.0 H | B |
| No. 19 | 73.1 | 59.0 | HC-12 | A | 3.0 H | B |
| No. 20 | 73.1 | 59.0 | HC-13 | A | 3.0 H | B |
| No. 21 | 68.6 | 35.0 | HC-1 | B | 3.5 H | B |

TABLE 6-continued

|  |  |  |  |  |  |  |
|---|---|---|---|---|---|---|
| No. 22 | 62.0 | 5.0 | HC-1 | B | 3.5 H | B |
| No. 23 | 59.6 | 5.0 | HC-1 | C | 3.5 H | B |
| No. 24 | 55.9 | 5.0 | HC-1 | D | 3.5 H | A |
| No. 25 | — | — | HC-1 | B | 2.0 H | D |
| No. 26 | 91.8 | 80.0 | HC-1 | B | 3.0 H | B |
| NO. 27 | 91.8 | 80.0 | HC-14 | A | 3.0 H | B |

X in the Table 6: Ratio of Compound Having Substitution Degree of 75% or More (%)

Y in the Table 6: Antistatic Property (2) after Heat and Humidity Test

TABLE 7

|  |  | HC-1 | HC-2 | HC-3 | HC-4 | HC-5 | HC-6 | HC-7 |
|---|---|---|---|---|---|---|---|---|
| Ionizing Radiation-curable Compound | A-TMM-3LM-N | 65.0 | 48.7 | 32.5 | 16.3 |  | 8.1 | 92.6 |
|  | A-TMMT | 27.6 | 43.9 | 60.1 | 76.3 |  | 84.5 |  |
|  | VISCOTE 295 |  |  |  |  | 83.3 |  |  |
|  | EB-5129 |  |  |  |  |  |  |  |
|  | BLEMMER GMR |  |  |  |  | 9.3 |  |  |
| Antistatic Agent | Compound IP-9 | 4.6 | 4.6 | 4.6 | 4.6 | 4.6 | 4.6 | 4.6 |
|  | Compound IP-13 |  |  |  |  |  |  |  |
|  | SAS-PE |  |  |  |  |  |  |  |
| Initiator | 1-Hydroxycyclohexyl Phenyl Ketone | 2.8 | 2.8 | 2.8 | 2.8 | 2.8 | 2.8 | 2.8 |
| Solvent | MEK | 70.0 | 70.0 | 70.0 | 70.0 | 70.0 | 70.0 | 70.0 |
|  | MIBK | 20.0 | 20.0 | 20.0 | 20.0 | 20.0 | 20.0 | 20.0 |
|  | Methanol | 5.0 | 5.0 | 5.0 | 5.0 | 5.0 | 5.0 | 5.0 |
|  | Cyclohexane | 5.0 | 5.0 | 5.0 | 5.0 | 5.0 | 5.0 | 5.0 |
|  | Isopropyl Alcohol |  |  |  |  |  |  |  |
|  | Total | 200.0 | 200.0 | 200.0 | 200.0 | 200.0 | 200.0 | 200.0 |
|  | Weight % of Polar Group-containing Compound Respect to Total Ionizing Radiation-curable Compound | 40% | 30% | 20% | 10% | 10% | 5% | 57% |
|  | Weight % of Antistatic Agent Respect to Total Ionizing Radiation-curable Compound | 5.0% | 5.0% | 5.0% | 5.0% | 5.0% | 5.0% | 5.0% |

|  |  | HC-8 | HC-9 | HC-10 | HC-11 | HC-12 | HC-13 | HC-14 |
|---|---|---|---|---|---|---|---|---|
| Ionizing Radiation-curable Compound | A-TMM-3LM-N | 62.1 | 61.1 | 59.9 | 65.0 | 65.0 | 23.6 | 16.7 |
|  | A-TMMT | 26.4 | 25.9 | 25.5 | 27.6 |  |  | 78.4 |
|  | VISCOTE 295 |  |  |  |  | 27.6 | 45.4 |  |
|  | EB-5129 |  |  |  |  |  | 23.6 |  |
|  | BLEMMER GMR |  |  |  |  |  |  |  |
| Antistatic Agent | Compound IP-9 | 8.8 | 10.4 | 12.0 |  | 4.6 | 4.6 |  |
|  | Compound IP-13 |  |  |  | 4.6 |  |  |  |
|  | SAS-PE |  |  |  |  |  |  | 1.9 |
| Initiator | 1-Hydroxycyclohexyl Phenyl Ketone | 2.7 | 2.6 | 2.6 | 2.8 | 2.8 | 2.8 | 2.9 |
| Solvent | MEK | 70.0 | 70.0 | 70.0 | 70.0 | 70.0 | 70.0 | 30.0 |
|  | MIBK | 20.0 | 20.0 | 20.0 | 20.0 | 20.0 | 20.0 |  |
|  | Methanol | 5.0 | 5.0 | 5.0 | 5.0 | 5.0 | 5.0 |  |
|  | Cyclohexane | 5.0 | 5.0 | 5.0 | 5.0 | 5.0 | 5.0 |  |
|  | Isopropyl Alcohol |  |  |  |  |  |  | 70.0 |
|  | Total | 200.0 | 200.0 | 200.0 | 200.0 | 200.0 | 200.0 | 200.0 |
|  | Weight % of Polar Group-containing Compound Respect to Total Ionizing Radiation-curable Compound | 40% | 40% | 40% | 40% | 40% | 40% | 10% |
|  | Weight % of Antistatic Agent Respect to Total Ionizing Radiation-curable Compound | 10.0% | 12.0% | 14.1% | 5.0% | 5.0% | 5.0% | 2.0% |

Example B

Production of Antireflective Film (Synthesis of Perfluoroolefin Copolymer P-1)

Perfluoroolefin copolymer P-1 was prepared in the same manner as in Perfluoroolefin copolymer (1) described in JP-A-2010-152311. The refractive index of the polymer was 1.422.

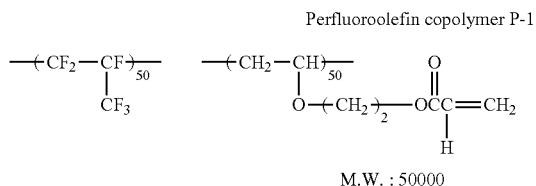

Perfluoroolefin copolymer P-1

M.W.: 50000

In the structural formula above, 50:50 indicates a molar ratio.

(Preparation of Hollow Silica Particle Dispersion A-1)

Hollow silica particle dispersion A-1 having an average particle size of 60 nm, a shell thickness of 10 nm and a refractive index of silica particle of 1.31 (solid content concentration of 18.2% by weight) was prepared in the same manner as in Dispersion A-1 described in JP-A-2007-298974 with adjusting the conditions.

(Preparation of Composition A-1 for Low Refractive Index Layer)

The composition shown below was charged in a mixing tank and stirred to prepare Composition A-1 for low refractive index layer (solid content concentration of 12.5% by weight).

| | |
|---|---|
| Perfluoroolefin copolymer P-1 | 14.8 parts by weight |
| Methyl ethyl ketone | 157.7 parts by weight |
| DPHA | 3.0 parts by weight |
| Hollow silica particle dispersion A-1 | 21.2 parts by weight |
| IRGACURE 127 | 1.3 parts by weight |
| X22-164C | 2.1 parts by weight |

The respective compounds used are described below.

DPHA: Mixture of dipentaerythritol pentaacrylate and dipentaerythritol hexaacrylate, produced by Nippon Kayaku Co., Ltd.

X22-164C: Reactive silicone, produced by Shin-Etsu Chemical Co., Ltd.

IRGACURE 127: Photopolymerization initiator, produced by Ciba Specialty Chemicals Inc.

(Preparation of Low Refractive Index Layer)

Composition A-1 for low refractive index layer was coated using a gravure coater on the antistatic hardcoat layer of the optical film (Sample No. 8) for Example 7 to prepare Antireflective film sample R-1. The drying condition was 90° C. for 30 seconds. The ultraviolet curing was conducted using an air-cooled metal halide lamp of 240 W/cm (produced by Eye Graphics Co., Ltd.) under the conditions of an illuminance of 600 mW/cm$^2$ and an irradiation doze of 600 mJ/cm$^2$ while purging with nitrogen to give an atmosphere having an oxygen concentration of 0.1% by volume or less. The thickness of the low refractive index layer was 95 nm.

Also, Composition A-1 for low refractive index layer was coated in the same manner as described above on the antistatic hardcoat layer of the optical film (Sample No. 11) for Example 10 to prepare Antireflective film sample R-2.

(Specular Reflectivity)

The antireflection property was evaluated by mounting an adapter ARV-474 on a spectrophotometer V-550 (produced by JASCO Corp.), measuring the specular reflectivity for the outgoing angle of 5° at an incident angle of 5° in the wavelength region from 380 to 780 nm, and calculating the average reflectivity from 450 to 650 nm. The results are shown in Table 8. Each of the performances shown in Table 8 was evaluated in the form of antireflective film.

TABLE 8

| Sample | | Performances of Antireflective Film | | | |
|---|---|---|---|---|---|
| No. of Antireflective Film | Sample No. of Optical Film Used | Spectral Reflectivity | Antistatic Property (1) of Fresh Sample | Pencil Hardness | Antistatic Property (2) after Heat and Humidity Test |
| R-1 | No. 7 | 1.23% | B | 3.0 H | B |
| R-2 | No. 10 | 1.23% | A | 4.0 H | A |

Example C

Preparation of Mixture of Plural Sugar Ester Compounds

Compounds 112 to 117 shown in Table 1 above and Compounds 118, 120 and 122 shown in Table 4 above were synthesized in the same manner as described in Example A.

Then, each of the sugar ester compounds were mixed to make the composition (indicated by a mole fraction) described in Table 9 below to prepare mixtures of plural sugar ester compounds, respectively.

(Preparation of Cellulose Ester Solution D-1)

The composition shown below was charged in a mixing tank, stirred with heating to dissolve respective components to prepare Cellulose ester solution D-1. The acetyl substitution degree of the cellulose ester was measured according to ASTM D-817-91. The viscosity average polymerization degree was measured according to an Uda et al's limiting viscosity method (Kazuo Uda, Hideo Saito, The Journal of Fiber Science and Technology, Japan, Vol. 18, No. 1, pp. 105-120 (1962)).

Composition of Cellulose Ester Solution D-1

| | |
|---|---|
| Cellulose ester (acetyl substitution degree of 2.86 and viscosity average polymerization degree of 310) | 100 parts by weight |
| Mixture of sugar ester compounds (having composition shown in Table 9) | 4.0 parts by weight |
| Methylene chloride | 375 parts by weight |
| Methanol | 82 parts by weight |
| Butanol | 5 parts by weight |

(Preparation of Matting Agent Dispersion M-1)

The composition shown below was charged in a disperser and stirred to dissolve respective components to prepare Matting agent dispersion M-1.

Composition of Matting Agent Dispersion M-1

| | |
|---|---|
| Silica particle dispersion (particle size of 16 nm (AEROSIL R972, produced by Nippon Aerosil Co., Ltd.) | 10.0 parts by weight |
| Methylene chloride | 62.5 parts by weight |
| Methanol | 14.1 parts by weight |
| Butanol | 0.8 parts by weight |
| Cellulose ester solution D-1 | 10.3 parts by weight |

(Preparation of Ultraviolet Absorber Solution U-1)

The composition shown below was charged in a mixing tank, stirred with heating to dissolve respective components to prepare Ultraviolet absorber solution U-1.

Composition of Ultraviolet Absorber Solution U-1

| | |
|---|---|
| Ultraviolet absorber (UV-1) shown below | 10.0 parts by weight |
| Ultraviolet absorber (UV-2) shown below | 10.0 parts by weight |
| Methylene chloride | 54.3 parts by weight |
| Methanol | 12.0 parts by weight |
| Butanol | 0.7 parts by weight |
| Cellulose ester solution D-1 | 12.9 parts by weight |

(UV-1)

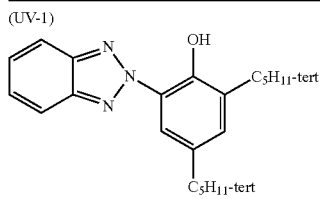

(UV-2)

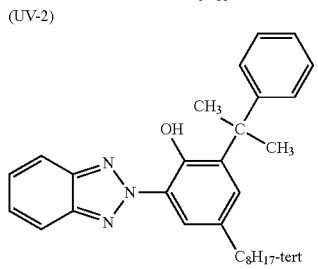

(Production of Base Material Films for Samples 31 to 39)
(Preparation of Dope for Core Layer)

To Cellulose ester solution D-1 were added the mixture of sugar ester compounds having the composition shown in Table 9 in an amount of 8.0 parts by weight based on 100 parts by weight of the cellulose ester and then Ultraviolet absorber solution U-1 so as to have 1.2 parts by weight of each of Ultraviolet absorber (UV-1) and Ultraviolet absorber (UV-2) based on 100 parts by weight of the cellulose ester, and the respective components were dissolved by thoroughly stirring with heating to prepare a dope.

(Preparation of Dope for Surface Layer 1)

To Cellulose ester solution D-1 were added Ultraviolet absorber solution U-1 so as to have 1.2 parts by weight of each of Ultraviolet absorber (UV-1) and Ultraviolet absorber (UV-2) based on 100 parts by weight of the cellulose ester and Matting agent dispersion M-1 so as to have 0.026 parts by weight of the silica particle based on 100 parts by weight of the cellulose ester, and the respective components were dissolved by thoroughly stirring with heating to prepare a dope.

(Preparation of Dope for Surface Layer 2)

To Cellulose ester solution D-1 were added Ultraviolet absorber solution U-1 so as to have 1.2 parts by weight of each of Ultraviolet absorber (UV-1) and Ultraviolet absorber (UV-2) based on 100 parts by weight of the cellulose ester and Matting agent dispersion M-1 so as to have 0.078 parts by weight of the silica particle based on 100 parts by weight of the cellulose ester, and the respective components were dissolved by thoroughly stirring with heating to prepare a dope.

As to each base material film, the dopes obtained were heated at 30° C. and co-cast in a three-layer construction from dies through a cast giesser on a mirror surface stainless steel support of a drum having a diameter of 3 m. The dope for surface layer 1 was cast so as to form a first layer having a dry thickness of 6 μm in contact with the support, the dope for core layer was cast so as to form a second layer having a dry thickness of 29 μm, and the dope for surface layer 2 was cast so as to form a third layer having a dry thickness of 5 μm. The surface temperature of the support was set 4° C., and the casting width was 1,470 mm. The special temperature of the whole casting unit was set at 15° C. The cellulose ester film cast and rotated in the state of the residual solvent amount of 240% was peeled from the drum at the point 50 cm before the terminal end of casting unit and clipped the both ends thereof with a pin tenter. At the peeling, the film was stretched by 6% in the conveying direction. Then, while holding the both side of the width direction (direction perpendicular to the conveying direction) of the film with a pin tenter (pin tenter described in FIG. 3 of JP-A-4-1009), the stretching treatment was conducted by 5% in the width direction. The design thickness of the cellulose ester film produced was 40 μm.

Thus, the base material films for Samples 31 to 39 were produced.

(Production of Optical Films of Samples 31 to 39)

Employing Coating solution HC-6 for forming antistatic hardcoat layer used in Example A, an antistatic hardcoat layer was formed on the first layer side of each of the base material films described above.

Specifically, the coating was conducted using a gravure coater and the curing of layer with ultraviolet irradiation in the same manner as in Example A. The design thickness of the antistatic hardcoat layer was 8 μm.

(Performance Evaluation of Samples 31 to 39)

Three items of Antistatic property (1), Pencil harness and Antistatic property after exposed to high temperature and high humidity environment (Antistatic property (2)) were evaluated in the same manner as in Example A.

The results obtained are shown in Table 9.

TABLE 9

| | | Compositor of Plasticizer (% by mole) | | | | | | | | Performances of Stack | | | | |
|---|---|---|---|---|---|---|---|---|---|---|---|---|---|---|
| Sample No. | Compound | Octa-substituted Compound 100% | Hepta-substituted Compound 87.5% | Hexa-substituted Compound 75% | Penta-substituted Compound 62.5% | Tetra-substituted Compound 50% | Tri-substituted Compound 37.5% | Average Ester Substitution Degree (%) | X (see below) | Antistatic Hardcoat Layer | Antistatic Property (1) of Fresh Sample | Penal Hardness | Y (see below) | Remarks |
| 31 | 112-117 | 7 | 20 | 31 | 13 | 2 | 0 | 83.9 | 85.0 | HC-6 | B | 3.5 H | B | Invention |
| | 118 | 27 | 0 | 0 | 0 | 0 | 0 | | | | | | | |
| 32 | 112-117 | 2 | 12 | 26 | 26 | 6 | 1 | 78.6 | 67.0 | HC-6 | A | 4.0 H | A | Invention |
| | 118 | 27 | 0 | 0 | 0 | 0 | 0 | | | | | | | |
| 33 | 112-117 | 0 | 5 | 14 | 29 | 17 | 5 | 70.4 | 46.0 | HC-6 | A | 4.0 H | A | Invention |
| | 118 | 27 | 0 | 0 | 0 | 0 | 0 | | | | | | | |

TABLE 9-continued

| Sample No. | Compound | Composition of Plasticizer (% by mole) | | | | | | Average Ester Substitution Degree (%) | X (see below) | Anti-static Hardcoat Layer | Anti-static Property (1) of Fresh Sample | Penal Hardness | Y (see below) | Remarks |
|---|---|---|---|---|---|---|---|---|---|---|---|---|---|---|
| | | Octa-substituted Compound 100% | Hepta-substituted Compound 87.5% | Hexa-substituted Compound 75% | Penta-substituted Compound 62.5% | Tetra-substituted Compound 50% | Tri-substituted Compound 37.5% | | | | | | | |
| 34 | 112-117 | 7 | 20 | 31 | 13 | 2 | 0 | 83.9 | 85.0 | HC-6 | B | 3.5 H | B | Invention |
| | 120 | 27 | 0 | 0 | 0 | 0 | 0 | | | | | | | |
| 35 | 112-117 | 2 | 12 | 26 | 26 | 6 | 1 | 78.6 | 67.0 | HC-6 | A | 4.0 H | A | Invention |
| | 120 | 27 | 0 | 0 | 0 | 0 | 0 | | | | | | | |
| 36 | 112-117 | 0 | 5 | 14 | 29 | 17 | 5 | 70.4 | 46.0 | HC-6 | A | 4.0 H | A | Invention |
| | 120 | 27 | 0 | 0 | 0 | 0 | 0 | | | | | | | |
| 37 | 112-117 | 7 | 20 | 31 | 13 | 2 | 0 | 83.9 | 85.0 | HC-6 | B | 3.5 H | B | Invention |
| | 122 | 27 | 0 | 0 | 0 | 0 | 0 | | | | | | | |
| 38 | 112-117 | 2 | 12 | 26 | 26 | 6 | 1 | 78.6 | 67.0 | HC-6 | A | 4.0 H | A | Invention |
| | 122 | 27 | 0 | 0 | 0 | 0 | 0 | | | | | | | |
| 39 | 112-117 | 0 | 5 | 14 | 29 | 17 | 5 | 70.4 | 46.0 | HC-6 | A | 4.0 H | A | Invention |
| | 122 | 27 | 0 | 0 | 0 | 0 | 0 | | | | | | | |

X in the Table 9: Ratio of Compound (Hexasubstituted Compound) Having Substitution Degree of 75% or More (%)
Y in the Table 9: Antistatic Property (2) after Heat and Humidity Test Example D Preparation of Cellulose Ester Solution D-2

The composition shown below was charged in a mixing tank, stirred with heating to dissolve respective components to prepare Cellulose ester solution D-2.
Composition of Cellulose Ester Solution D-2

| | |
|---|---|
| Cellulose ester (acetyl substitution degree of 2.86 and viscosity average polymerization degree of 310) | 100 parts by weight |
| Mixture of sugar ester compounds (having composition shown in Table 10) | 4.0 parts by weight |
| Methylene chloride | 375 parts by weight |
| Methanol | 82 parts by weight |
| Butanol | 5 parts by weight |

(Preparation of Matting Agent Dispersion M-2)

The composition shown below was charged in a disperser and stirred to dissolve respective components to prepare Matting agent dispersion M-2.
Composition of Matting Agent Dispersion M-2

| | |
|---|---|
| Silica particle dispersion (particle size of 16 nm (AEROSIL R972, produced by Nippon Aerosil Co., Ltd.) | 10.0 parts by weight |
| Methylene chloride | 62.5 parts by weight |
| Methanol | 14.1 parts by weight |
| Butanol | 0.8 parts by weight |
| Cellulose ester solution D-2 | 10.3 parts by weight |

(Preparation of Ultraviolet Absorber Solution U-2)

The composition shown below was charged in a mixing tank, stirred with heating to dissolve respective components to prepare Ultraviolet absorber solution U-2.
Composition of Ultraviolet Absorber Solution U-2

| | |
|---|---|
| Ultraviolet absorber (UV-1) | 10.0 parts by weight |
| Ultraviolet absorber (UV-2) | 10.0 parts by weight |
| Methylene chloride | 54.3 parts by weight |
| Methanol | 12.0 parts by weight |
| Butanol | 0.7 parts by weight |
| Cellulose ester solution D-2 | 12.9 parts by weight |

(Production of Base Material Films for Samples 41 to 43)
(Preparation of Dope for Core Layer)

To Cellulose ester solution D-2 were added the mixture of sugar ester compounds having the composition shown in Table 10 in an amount of 8.0 parts by weight based on 100 parts by weight of the cellulose ester and then Ultraviolet absorber solution U-2 so as to have 1.2 parts by weight of each of Ultraviolet absorber (UV-1) and Ultraviolet absorber (UV-2) based on 100 parts by weight of the cellulose ester, and the respective components were dissolved by thoroughly stirring with heating to prepare a dope.

(Preparation of Dope for Surface Layer 1)

To Cellulose ester solution D-2 were added Ultraviolet absorber solution U-2 so as to have 1.2 parts by weight of each of Ultraviolet absorber (UV-1) and Ultraviolet absorber (UV-2) based on 100 parts by weight of the cellulose ester, Matting agent dispersion M-2 so as to have 0.026 parts by weight of the silica particle based on 100 parts by weight of the cellulose ester and methylene chloride so as to have 85% by weight of the dope solvent, and the respective components were dissolved by thoroughly stirring with heating to prepare a dope.

(Preparation of Dope for Surface Layer 2)

To Cellulose ester solution D-2 were added Ultraviolet absorber solution U-2 so as to have 1.2 parts by weight of each of Ultraviolet absorber (UV-1) and Ultraviolet absorber (UV-2) based on 100 parts by weight of the cellulose ester, Matting agent dispersion M-2 so as to have 0.078 parts by weight of the silica particle based on 100 parts by weight of the cellulose ester and methylene chloride so as to have 85% by weight of the dope solvent, and the respective components were dissolved by thoroughly stirring with heating to prepare a dope.

The rate of methylene chloride in the total solvent used in the dope for surface layer is preferably from 83 to 97% by weight, more preferably from 83 to 92% by weight. In the range described above, when the hardcoat layer is coated on the cellulose ester film, the adhesion property is good, and further the reworking property of a polarizing plate is good.

As to each base material film, the dopes obtained were heated at 30° C. and co-cast in a three-layer construction from dies through a cast giesser on a mirror surface stainless steel support of a drum having a diameter of 3 m. The dope for surface layer 1 was cast so as to form a first layer having a dry thickness of 6 µm in contact with the support, the dope for core layer was cast so as to form a second layer having a dry thickness of 29 µm, and the dope for surface layer 2 was cast so as to form a third layer having a dry thickness of 5 µm. The surface temperature of the support was set 4° C., and the casting width was 1,470 mm. The special temperature of the whole casting unit was set at 15° C. The cellulose ester film cast and rotated in the state of the residual solvent amount of 240% was peeled from the drum at the point 50 cm before the terminal end of casting unit and clipped the both ends thereof with a pin tenter. At the peeling, the film was stretched by 6% in the conveying direction. Then, while holding the both side of the width direction (direction perpendicular to the conveying direction) of the film with a pin tenter (pin tenter described in FIG. 3 of JP-A-4-1009), the stretching treatment was conducted by 5% in the width direction. The design thickness of the cellulose ester film produced was set to 40 µm to produce the base material films for Samples 41 to 43.

The stretching of cellulose ester film in the conveying direction or in the width direction is effective for controlling curl in a film having a hardcoat layer or in the form of a polarizing plate, and is preferably in a range from 3 to 20%, and more preferably in a range from 5 to 15%.

(Production of Base Material Films for Samples 44 to 46)
(Preparation of Dope for Core Layer)

To Cellulose ester solution D-2 were added the mixture of sugar ester compounds having the composition shown in Table 10 in an amount of 11.0 parts by weight based on 100 parts by weight of the cellulose ester and then Ultraviolet absorber solution U-2 so as to have 1.2 parts by weight of each of Ultraviolet absorber (UV-1) and Ultraviolet absorber (UV-2) based on 100 parts by weight of the cellulose ester, and the respective components were dissolved by thoroughly stirring with heating to prepare a dope.

(Preparation of Dope for Surface Layer 1)

To Cellulose ester solution D-2 were added Ultraviolet absorber solution U-2 so as to have 1.2 parts by weight of each of Ultraviolet absorber (UV-1) and Ultraviolet absorber (UV-2) based on 100 parts by weight of the cellulose ester, Matting agent dispersion M-2 so as to have 0.026 parts by weight of the silica particle based on 100 parts by weight of the cellulose ester and methylene chloride so as to have 85% by weight of the dope solvent, and the respective components were dissolved by thoroughly stirring with heating to prepare a dope.

(Preparation of Dope for Surface Layer 2)

To Cellulose ester solution D-2 were added Ultraviolet absorber solution U-2 so as to have 1.2 parts by weight of each of Ultraviolet absorber (UV-1) and Ultraviolet absorber (UV-2) based on 100 parts by weight of the cellulose ester, Matting agent dispersion M-2 so as to have 0.078 parts by weight of the silica particle based on 100 parts by weight of the cellulose ester and methylene chloride so as to have 85% by weight of the dope solvent, and the respective components were dissolved by thoroughly stirring with heating to prepare a dope.

As to each base material film, the dopes obtained were heated at 30° C. and co-cast in a three-layer construction from dies through a cast giesser on a mirror surface stainless steel support of a drum having a diameter of 3 m. The dope for surface layer 1 was cast so as to form a first layer having a dry thickness of 2 µm in contact with the support, the dope for core layer was cast so as to form a second layer having a dry thickness of 54 µm, and the dope for surface layer 2 was cast so as to form a third layer having a dry thickness of 4 µm. The surface temperature of the support was set −7° C., and the casting width was 1,470 mm. The special temperature of the whole casting unit was set at 15° C. The cellulose ester film cast and rotated was dried with drying wind of 30° C. on the drum, peeled in the state of the residual solvent amount of 240% from the drum at the point 50 cm before the terminal end of casting unit, and clipped the both ends thereof with a pin tenter. At the peeling, the film was stretched by 10% in the conveying direction. Then, while holding the both side of the width direction (direction perpendicular to the conveying direction) of the film with a pin tenter (pin tenter described in FIG. 3 of JP-A-4-1009), the stretching treatment was conducted by 5% in the width direction. The design thickness of the cellulose ester film produced was 60 µm.

Thus, the base material films for Samples 44 to 46 were produced.

(Production of Optical Films of Samples 41 to 46)

Employing Coating solution HC-6 for forming antistatic hardcoat layer used in Example A, an antistatic hardcoat layer was formed on each of the base material films described above.

Specifically, the coating was conducted using a gravure coater and the curing of layer with ultraviolet irradiation in the same manner as in Example A. The design thickness of the antistatic hardcoat layer was 8 µm.

(Performance Evaluation of Samples 41 to 46)

Three items of Antistatic property (1), Pencil harness and Antistatic property after exposed to high temperature and high humidity environment (Antistatic property (2) were evaluated in the same manner as in Example A.

The results obtained are shown in Table 10.

TABLE 10

| Sample No. | Compound | Composition of Plasticizer (% by mole) | | | | | | Average Ester Substitution Degree (%) | X (see below) | Antistatic Hardcoat Layer | Performances of Stack | | | Remarks |
| | | Octa-substituted Compound 100% | Hepta-substituted Compound 87.5% | Hexa-substituted Compound 75% | Penta-substituted Compound 62.5% | Tetra-substituted Compound 50% | Tri-substituted Compound 37.5% | | | | Antistatic Property (1) of Fresh Sample | Pencil Hardness | Y (see below) | |
| 41 | 112-117 | 7 | 20 | 31 | 13 | 2 | 0 | 83.9 | 85.0 | HC-6 | A | 4.0 H | B | Invention |
| | 120 | 27 | 0 | 0 | 0 | 0 | 0 | | | | | | | |
| 42 | 112-117 | 2 | 12 | 26 | 26 | 6 | 1 | 78.6 | 67.0 | HC-6 | A | 4.0 H | A | Invention |
| | 120 | 27 | 0 | 0 | 0 | 0 | 0 | | | | | | | |
| 43 | 112-117 | 0 | 5 | 14 | 29 | 17 | 5 | 70.4 | 46.0 | HC-6 | A | 4.0 H | A | Invention |
| | 120 | 27 | 0 | 0 | 0 | 0 | 0 | | | | | | | |
| 44 | 112-117 | 7 | 20 | 31 | 13 | 2 | 0 | 83.9 | 85.0 | HC-6 | A | 4.0 H | B | Invention |
| | 120 | 27 | 0 | 0 | 0 | 0 | 0 | | | | | | | |
| 45 | 112-117 | 2 | 12 | 26 | 26 | 6 | 1 | 78.6 | 67.0 | HC-6 | A | 4.0 H | A | Invention |
| | 120 | 27 | 0 | 0 | 0 | 0 | 0 | | | | | | | |

TABLE 10-continued

| | | Composition of Plasticizer (% by mole) | | | | | | | | | Performances of Stack | | | | |
| --- | --- | --- | --- | --- | --- | --- | --- | --- | --- | --- | --- | --- | --- | --- | --- |
| Sample No. | Compound | Octa-substituted Compound 100% | Hepta-substituted Compound 87.5% | Hexa-substituted Compound 75% | Penta-substituted Compound 62.5% | Tetra-substituted Compound 50% | Tri-substituted Compound 37.5% | Average Ester Substitution Degree (%) | X (see below) | Antistatic Hardcoat Layer | Antistatic Property (1) of Fresh Sample | Pencil Hardness | Y (see below) | Remarks |
| 46 | 112-117 | 0 | 5 | 14 | 29 | 17 | 5 | 70.4 | 46.0 | HC-6 | A | 4.0 H | A | Invention |
| | 120 | 27 | 0 | 0 | 0 | 0 | 0 | | | | | | | |

X in the Table 10: Ratio of Compound (Hexasubstituted Compound) Having Substitution Degree of 75% or More (%)
Y in the Table 10: Antistatic Property (2) after Heat and Humidity Test

What is claimed is:

1. An optical film comprising a cellulose acylate film base material containing cellulose acylate and a plurality of sugar ester compounds having different ester substitution degrees in which an average ester substitution degree of the plurality of sugar ester compounds is from 60 to 94%, and an antistatic hardcoat layer formed from a coating composition containing at least an organic antistatic agent and a curable compound having a (meth)acryloyl group in a molecule of the curable compound.

2. The optical film as claimed in claim 1, wherein a content of a sugar ester compound having an ester substitution degree of 75% or more is 80% by mole or less of a total content of the plurality of sugar ester compounds.

3. The optical film as claimed in claim 1, wherein the antistatic hardcoat layer is formed from a coating composition containing at least an organic antistatic agent, a curable compound having three or more (meth)acryloyl groups in a molecule of the curable compound, an initiator and a solvent.

4. The optical film as claimed in claim 1, wherein the organic antistatic agent is an antistatic agent having a quaternary ammonium salt group.

5. The optical film as claimed in claim 4, wherein a content of the antistatic agent having a quaternary ammonium salt group is from 1 to 12% by weight based on a weight of the curable compound having a (meth)acryloyl group in the coating composition for forming antistatic hardcoat layer.

6. The optical film as claimed in claim 1, wherein a total content of a curable compound having a (meth)acryloyl group and further having at least one group selected from a hydroxy group, a carboxy group and a urethane group is 40% by weight or less based on a total weight of the curable compound having a (meth)acryloyl group in the coating composition for forming antistatic hardcoat layer.

7. A method of producing an optical film as claimed in claim 1, comprising applying the coating composition and curing the applied coating composition.

8. An antireflective film comprising a low refractive index layer either directly or through other layer on the optical film as claimed in claim 1.

9. A polarizing plate comprising the optical film as claimed in claim 1 as a protective film for the polarizing plate.

10. An image display device comprising a display and the optical film as claimed in claim 1.

* * * * *